US012798695B2

(12) United States Patent
Shen et al.

(10) Patent No.: US 12,798,695 B2
(45) Date of Patent: Nov. 17, 2026

(54) AUTOMOBILE SPACE EXTENSION MECHANISM

(71) Applicant: T. J. ELEVATOR ENGINEERING CO., LTD., Kaohsiung (CN)

(72) Inventors: Jungfu Shen, Kaohsiung (CN); Mengwei Shen, Kaohsiung (CN); Menghan Shen, Kaohsiung (CN)

(73) Assignee: T. J. ELEVATOR ENGINEERING CO., LTD., Kaohsiung (CN)

(*) Notice: Subject to any disclaimer, the term of this patent is extended or adjusted under 35 U.S.C. 154(b) by 252 days.

(21) Appl. No.: 18/754,222

(22) Filed: Jun. 26, 2024

(65) Prior Publication Data

US 2025/0002095 A1 Jan. 2, 2025

(30) Foreign Application Priority Data

Jun. 29, 2023 (CN) ........................ 202310779524.4

(51) Int. Cl.
*B60P 3/34* (2006.01)
*B62D 33/08* (2006.01)

(52) U.S. Cl.
CPC ................ *B62D 33/08* (2013.01); *B60P 3/34* (2013.01)

(58) Field of Classification Search
CPC .................................... B60P 3/34; B60P 3/39
USPC ....................... 296/26.08, 26.09, 26.1, 26.11
See application file for complete search history.

(56) References Cited

U.S. PATENT DOCUMENTS 2,246,813 A 6/1941 Preston
3,888,539 A * 6/1975 Niessner .................. B60P 3/34 296/156
4,139,229 A 2/1979 Cooper
4,163,577 A * 8/1979 Vanderslice ............. B60P 3/36 296/175
4,729,594 A 3/1988 Hoff
5,066,065 A 11/1991 Baughman
6,257,638 B1 * 7/2001 Graber ...................... B60P 3/34 296/26.08
10,017,098 B2 * 7/2018 Ronsen ..................... B60P 3/34
(Continued)

FOREIGN PATENT DOCUMENTS

CN 202783397 U 3/2013
CN 107476602 A 12/2017
(Continued)

OTHER PUBLICATIONS

English translation of JP2004058712 (Year: 2004).*
(Continued)

*Primary Examiner* — Joseph D. Pape
(74) *Attorney, Agent, or Firm* — Bayramoglu Law Offices LLC

(57) ABSTRACT

An automobile space extension mechanism is provided. The automobile space extension mechanism includes a space extension assembly and an adapter assembly. The space extension assembly is movably installed at a tail of a compartment of an automobile body through the adapter assembly; and in use, when a rear cover of the compartment is opened, the space extension assembly is unfolded backwards and downwards into a frame structure through pulling and flipping operations, and an opening side of the frame structure faces the compartment of the automobile body and is communicated to interior space of the compartment.

12 Claims, 17 Drawing Sheets

(56) References Cited

U.S. PATENT DOCUMENTS

| | | | | |
|---|---|---|---|---|
| 2002/0105201 | A1 * | 8/2002 | Melotik | B60R 5/041 296/37.1 |
| 2002/0140245 | A1 * | 10/2002 | Coleman, II | B60R 5/04 296/26.09 |
| 2009/0179455 | A1 | 7/2009 | Ogden | |
| 2022/0242208 | A1 | 8/2022 | Klein | |

FOREIGN PATENT DOCUMENTS

| | | | | |
|---|---|---|---|---|
| CN | 108001320 | A | | 5/2018 |
| CN | 210217224 | U | | 3/2020 |
| CN | 211710756 | U | | 10/2020 |
| CN | 211731639 | U | | 10/2020 |
| CN | 112172656 | A | | 1/2021 |
| CN | 113320465 | A | | 8/2021 |
| CN | 115476770 | A | | 12/2022 |
| DE | 20213307 | U1 | | 10/2002 |
| DE | 102014012321 | A1 | | 2/2016 |
| JP | S6440742 | U | | 3/1989 |
| JP | 2004058712 | | * | 2/2004 |
| JP | 2004058712 | A | | 2/2004 |
| JP | 3202971 | U | | 3/2016 |
| KR | 200352156 | | * | 6/2004 |
| KR | 100917981 | B1 | | 9/2009 |
| KR | 102180835 | B1 | | 11/2020 |
| KR | 102197713 | | * | 12/2020 |
| KR | 20210078448 | A | | 6/2021 |
| WO | 2020111355 | A1 | | 6/2020 |

OTHER PUBLICATIONS

JGJ 100-2015, Code for design of parking garage building, China National Standards, 2015, Ministry of Housing and Urban-Rural Development of the People's Republic of China.

* cited by examiner

AUTOMOBILE SPACE EXTENSION MECHANISM

CROSS-REFERENCE TO THE RELATED APPLICATIONS

This application is based upon and claims priority to Chinese Patent Application No. 202310779524.4, filed on Jun. 29, 2023, the entire contents of which are incorporated herein by reference.

TECHNICAL FIELD

The present disclosure relates to the field of automobile parts, and in particular, to an automobile space extension mechanism.

BACKGROUND

In Article 1.3 of Chapter 4 of the industry standard *Design Code for Garage JGJ*100-98, Table 4.1.3 "Minimum Indoor Net Height in Garage" lists following detailed regulations on a height of an indoor garage:

- a minimum net height of an indoor garage for micro and small vehicles is 2.2 m;
- a minimum net height of an indoor garage for light vehicles is 2.8 m;
- a minimum net height of an indoor garage for medium, large, and articulated passenger cars is 3.4 m; and
- a minimum net height of an indoor garage for medium, large, and articulated trucks is 4.2 m.

Therefore, according to the regulations in the standard, garages in blocks and other buildings generally require a net height of at least 2.2 m.

A height of an automobile body is defined as a distance from the ground to a highest point of an automobile. The highest point is a highest position on a top of the automobile body, but does not include a length of a roof antenna. It can be known through Baidu that a family automobile (sedan) has a length of 3,800 mm to 4,300 mm, a width of 1,600 mm to 1,800 mm, and a height of 1,400 mm to 1,600 mm; and a sport utility vehicle (SUV) generally has a height of 1,600 mm to 2,400 mm, and SUVs of different levels have different heights: 1) A small SUV generally has a height of 1,720 mm; 2) A compact SUV generally has a height of 1,950 mm; 3) A medium SUV typically has a height of 2,000 mm; 4) A large SUV has a height of 2,300 mm, and a largest full-size SUV has a height of 2,400 mm.

For a vast majority of families, ordinary sedans or small and medium SUVs are commonly used as family automobiles. These types of automobiles can smoothly enter the garage and be conveniently parked. However, these types of automobiles are mainly used for carrying people or a small amount of load. When an automobile is used for a tour or overnight sleeping, there are many shortcomings due to limited space inside the automobile. For example, there is no bathroom equipment in the automobile (only a large recreational vehicle (RV) has bathroom equipment). Therefore, tourist parking lots are limited to camp areas or parking lots with bathroom facilities, greatly reducing convenience of overnight parking. Especially in an open and uninhabited area, or when there is a long commuting distance, a regular family sedan cannot meet a demand for temporary toilet use due to a special circumstance.

Therefore, it has become an urgent technical problem to be resolved by those skilled in the art to figure out how to develop an automobile space extension mechanism and assemble the automobile space extension mechanism onto an existing automobile to expand interior space of the automobile to provide stable and private additional space and meet demands for overnight sleeping in a tour, personal toileting, bathing, and the like.

SUMMARY

The present disclosure is intended to provide an automobile space extension mechanism to resolve problems of small space, inconvenient tours and overnight accommodation, and the like in an existing family automobile.

In order to resolve the above technical problem, the present disclosure employs following technical solutions:

An automobile space extension mechanism in the present disclosure includes a space extension assembly and an adapter assembly, where the space extension assembly is movably installed at a tail of a compartment of an automobile body through the adapter assembly; and in use, when a rear cover of the compartment is opened, the space extension assembly is unfolded backwards and downwards into a frame structure through pulling and flipping operations, and an opening side of the frame structure faces the compartment of the automobile body and is communicated to interior space of the compartment.

Preferably, the space extension assembly is connected to left and right sides of the tail of the compartment of the automobile body or to a top of the tail of the compartment in a sliding manner.

Preferably, the space extension assembly is connected to the left and right sides of the tail of the compartment of the automobile body through a slide rail connecting assembly or a guiding slide positioning plate; the slide rail connecting assembly includes a side guiding slide groove and a side slide rail; the side slide rail is connected to the side guiding slide groove in a sliding manner, the side guiding slide groove is installed on the left and right sides of the tail of the compartment of the automobile body, and the side slide rail is connected to the space extension assembly; and the guiding slide positioning plate is installed on the left and right sides of the tail of the compartment of the automobile body, and the space extension assembly is connected to a chute of the guiding slide positioning plate in a sliding manner.

Preferably, the space extension assembly includes a side plate assembly, a back plate assembly, and a bottom plate that are connected together;

- the side plate assembly includes a main side plate, an upper side plate, and a lower side plate, the upper side plate and the lower side plate are respectively telescopically connected to two ends of the main side plate, and the side slide rail is connected to an outer side face of the main side plate; and
- the back plate assembly includes an upper back plate, a main back plate, and a lower back plate that are arranged from top to bottom, the main back plate, the upper back plate, and the lower back plate are respectively connected in a flippable manner to outer side edges of the main side plate, the upper side plate, and the lower side plate; and the bottom plate is connected to a bottom edge of the lower side plate.

Preferably, the bottom plate adopts a single-plate structure or a symmetrical double-plate structure; and when the single-plate structure is adopted, two ends of the bottom plate are connected to bottom edges of two lower side plates through screws; or when the double-plate structure is adopted, the bottom plate is connected in a flippable manner to the bottom edge of the lower side plate through a third rotary connector.

Preferably, the main back plate is hinged on the outer side edge of the main side plate through a second rotary connector, and both the upper back plate and the lower back plate are connected to the outer side edges of the upper side plate and the lower side plate through a first rotary connector; and the upper back plate and lower back plate are flipped and then folded together with the upper side plate and the lower side plate, the main back plate is flipped and then parallel to the main side plate, with a storage gap reserved in the middle, and a thickness of the storage gap matches a total thickness of the folded upper side plate, lower side plate, upper back plate, and lower back plate.

Preferably, inner side faces of upper and lower ends of the main side plate are provided with avoidance steps, and a depth of the avoidance step is not less than a total height of the upper side plate and the lower side plate; and a total height of the upper back plate and the lower back plate is not greater than a maximum total height of the upper side plate and the lower side plate.

Preferably, the space extension assembly is connected to the top of the tail of the compartment of the automobile body through a lifted guiding slide assembly, and the lifted guiding slide assembly includes an upper guiding slide groove and an upper guiding slide plate that are connected together in a sliding manner, where the upper guiding slide groove is installed on the top of the tail of the compartment of the automobile body, and the upper guiding slide plate is installed on the space extension assembly.

Preferably, during lifting, the space extension assembly is set as a lifted folding assembly, and the lifted folding assembly includes an upper connecting plate, a folding side plate assembly, and a folding back plate assembly, a top surface of the upper connecting plate is connected to the upper guiding slide groove through the upper guiding slide plate in a sliding manner, two folding side plate assemblies are symmetrically arranged and connected to left and right side edges of the upper connecting plate, and the folding back plate assembly is connected in a flippable manner to the folding side plate assembly.

Preferably, the folding side plate assembly includes an upper folding side plate, an intermediate folding side plate, and a lower folding side plate that are sequentially folded and connected together, one side edge of the upper folding side plate is connected to a side edge of the upper connecting plate, and edges connecting the upper folding side plate, the intermediate folding side plate, and the lower folding side plate are connected together through a 180° hinge structure or a flexible connector;

the folding back plate assembly includes an upper folding back plate, an intermediate folding back plate, and a lower folding back plate, and the upper folding back plate, the intermediate folding back plate, and the lower folding back plate are respectively connected to outer side edges of the upper folding side plate, the intermediate folding side plate, and the lower folding side plate through a 90° hinge structure or the flexible connector; and a bottom plate is further included, where the bottom plate adopts a double-plate structure, and the bottom plate is connected in a flippable manner to a bottom edge of the lower folding side plate through the 90° hinge structure or the flexible connector.

Preferably, the space extension assembly is designed as an articulated flipping assembly, and the articulated flipping assembly is connected in a flippable manner to an adaptive positioning structure through a hinge; and the articulated flipping assembly includes a flippable side plate assembly, a flippable back plate assembly, and a flippable bottom plate, where the flippable side plate assembly includes a main positioning plate and a lower flippable side plate, an inner side edge of the main positioning plate is hinged on the adaptive positioning structure, and a side intermediate transition plate is hinged between the main positioning plate and the lower flippable side plate, and adjacent edges of the main positioning plate, the lower flippable side plate, and the side intermediate transition plate are connected together through a 90° articulation piece; and the flippable back plate assembly includes a rear upper flippable plate and a rear lower flippable plate, where the rear upper flippable plate is hinged on an outer vertical edge of the main positioning plate, and the rear lower flippable plate is hinged on an outer vertical edge of the lower flippable side plate; and a bottom edge of the rear upper flippable plate is hinged on a rear intermediate transition plate, and the flippable bottom plate is hinged on a bottom edge of the rear lower flippable plate.

Preferably, the adaptive positioning structure includes a telescopic rod, where a bottom of the telescopic rod is positioned and connected to a bottom of the compartment through a bottom connecting plate, and a positioning hole of the bottom connecting plate coincides with a positioning hole of a seat in an automobile; a top of the telescopic rod is connected to a top positioning plate, and a top surface of the top positioning plate is connected to an adaptive member, where the adaptive member is made of a flexible material; and an outer side of the telescopic rod is connected to an assembly positioning plate, the assembly positioning plate is provided with a plurality of positioning holes, and the inner side edge of the main positioning plate is hinged on the assembly positioning plate.

Preferably, the space extension assembly is designed as a roof folding extension assembly, and the roof folding extension assembly includes an upper assembly and a lower assembly, where the upper assembly includes an upper side plate and an upper back plate that are hinged together, with a left side edge of the upper side plate hinged on the rear cover of the compartment; and the lower assembly includes a lower side plate, a lower back plate, and a bottom plate, the three plates are hinged together based on corresponding edges after the three plates are flipped, and the lower side plate and the upper side plate are articulated or pulled together, and are in a stacked state when not unfolded and are of a frame structure when unfolded.

Preferably, the space extension assembly is designed as a roof Z-shaped folding assembly, and the roof Z-shaped folding assembly includes an upper folding assembly, a lower folding assembly, and a straight-line-shaped bottom plate, where the upper folding assembly includes an upper side plate and an upper back plate that are hinged together, with a left side edge of the upper side plate hinged on the rear cover of the compartment; and the lower folding assembly includes a lower side plate and a lower back plate that are hinged together, left and right edges of two symmetrical lower side plates are connected to the straight-line-shaped bottom plate, the three plates are hinged together based on corresponding edges after the three plates are flipped, edges that are of the lower side plate and the upper side plate and close to each other are hinged together, and the lower side plate and the upper side plate are in a stacked state when not unfolded, are Z-shaped during unfolding, and are of a frame structure when completely unfolded.

Preferably, the space extension assembly is designed as a sliding-flipping assembly, including a flipping drive assembly, a flipping extension assembly, and a support roller, where one end of the flipping drive assembly is connected to the left and right sides of the tail of the compartment of the automobile body, and the other end of the flipping drive assembly is hinged on a sidewall of the flipping extension assembly; and the support roller is installed at the tail of the compartment of the automobile body and located below the flipping extension assembly. When the rear cover of the compartment is opened, the flipping drive assembly is started, such that the flipping drive assembly is unfolded and drives the flipping extension assembly to slide backwards and flip to a vertical state. Folding plates on the flipping extension assembly are sequentially unfolded to form a frame structure.

Compared with the prior art, the present disclosure has following beneficial technical effects:

The automobile space extension mechanism in the present disclosure includes the space extension assembly and the adapter assembly. The space extension assembly is movably installed at the tail of the compartment of the automobile body through the adapter assembly. The space extension assembly is connected to the left and right sides of the tail of the compartment of the automobile body through the slide rail connecting assembly or the guiding slide positioning plate, or connected to the top of the tail of the compartment of the automobile body through the lifted guiding slide assembly. In use, when the rear cover of the compartment is opened, the space extension assembly is unfolded into the frame structure through the pulling and flipping operations, where the opening side of the frame structure faces the compartment of the automobile body and is communicated to the interior space of the compartment.

The present disclosure has a clever concept and a compact and reasonable structure. The space extension assembly is reasonably accommodated inside the compartment in a folded state, and is located at the tail of the compartment, without occupying passenger room. During traveling, the automobile can be smoothly driven to a parking lot. When the rear cover of the compartment is opened, the space extension assembly is unfolded, which can effectively increase the interior space of the compartment. Good stability and privacy meet demands for overnight sleeping in a tour, temporary toilet use, bathing, and the like, thereby improving traveling convenience of personnel.

BRIEF DESCRIPTION OF THE DRAWINGS

The present disclosure will be further described below with reference to the accompanying drawings.

Figure 1:
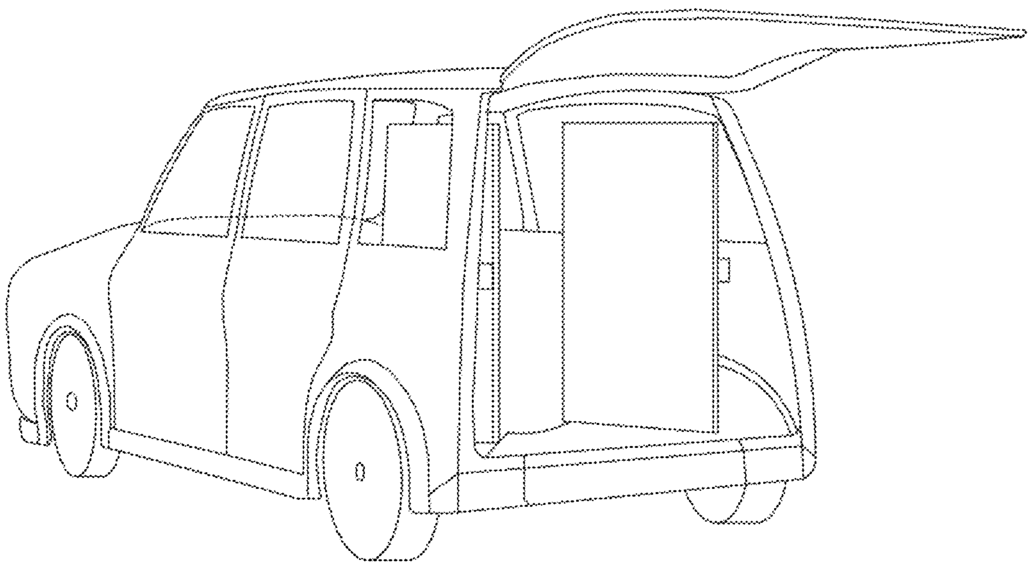
FIG. 1 schematically shows a folded state of an automobile space extension mechanism inside an automobile according to the present disclosure (Embodiment 1)
Figure 2:
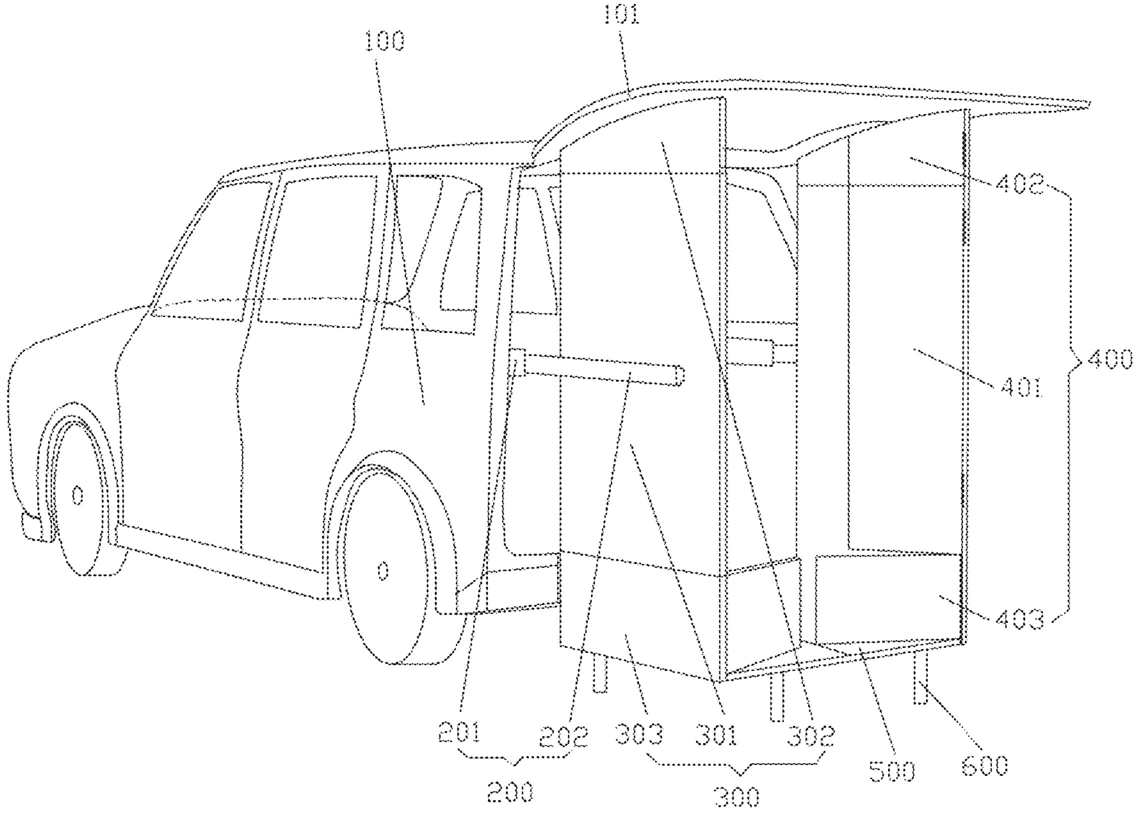
FIG. 2 schematically shows a status in a process of unfolding an automobile space extension mechanism according to the present disclosure (Embodiment 1)
Figure 3:
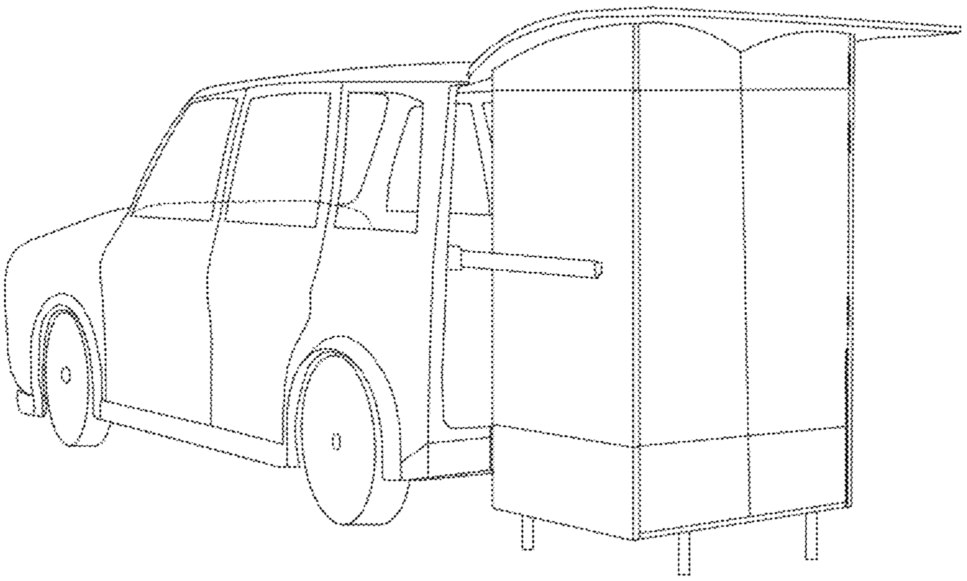
FIG. 3 schematically shows a completely unfolded state of an automobile space extension mechanism according to the present disclosure (Embodiment 1)
Figure 4:
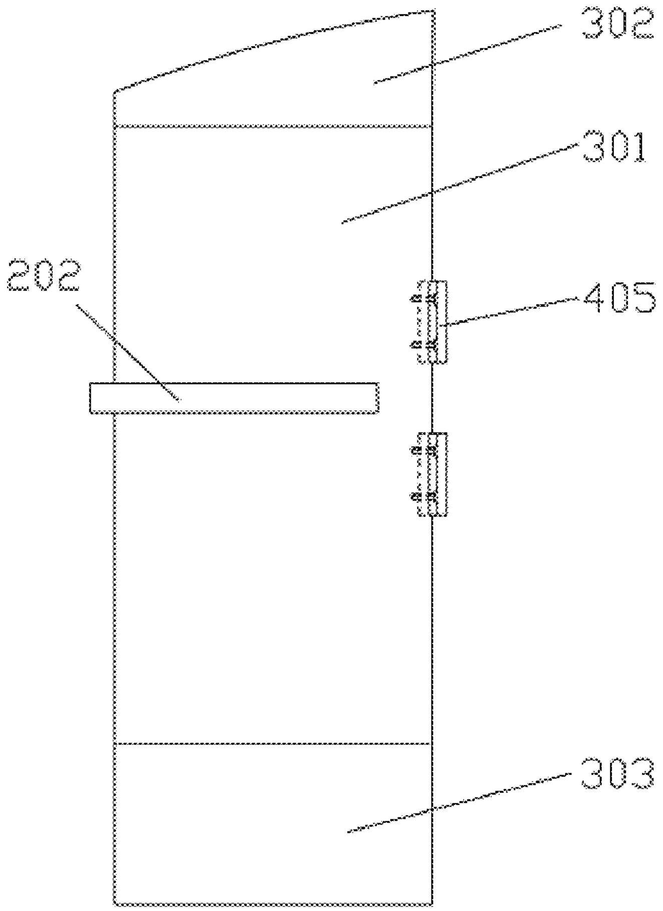
FIG. 4 is a front view of a pulled folding assembly according to the present disclosure.
Figure 5:
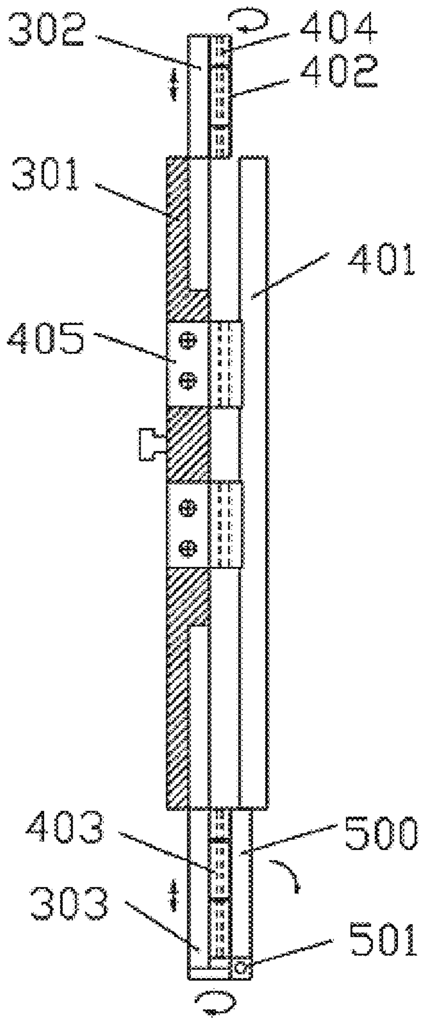
FIG. 5 is a side view of a pulled folding assembly according to the present disclosure.
Figure 6:
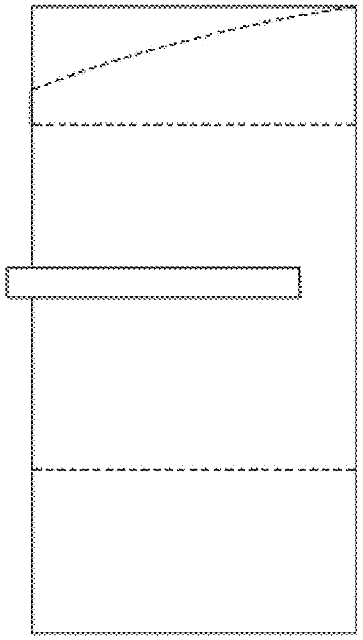
FIG. 6 is a schematic diagram of a pulled folding assembly according to the present disclosure (partial overlapping)

Reference numerals: 100. automobile body; 101. rear cover of a compartment; 102. telescopic rod; 103. bottom connecting plate; 104. top positioning plate; 105. assembly positioning plate;

200. slide rail connecting assembly: 201. side guiding slide groove; 202. side slide rail;

300. side plate assembly: 301. main side plate; 302. upper side plate; 303. lower side plate;

400. back plate assembly: 401. main back plate; 402. upper back plate; 403. lower back plate; 404. first rotary connector; 405. second rotary connector;

500. bottom plate: 501. third rotary connector; 600. support leg; 700. guiding slide positioning plate; 701. roller; 800. lifted guiding slide assembly; 801. upper guiding slide groove; 802. upper guiding slide plate;
900. lifted folding assembly; 901. upper connecting plate; 902. upper folding side plate; 903. intermediate folding side plate; 904. lower folding side plate; 905. upper folding back plate; 906. intermediate folding back plate; 907. lower folding back plate; 908. flexible connector;
910. articulated flipping assembly: 911. main positioning plate; 912. lower flippable side plate; 913. side intermediate transition plate; 914. rear upper flippable plate; 915. rear lower flippable plate; 916. rear intermediate transition plate; 917. flippable bottom plate;
920. roof folding extension assembly; 921. upper assembly; 922. lower assembly;
930. roof Z-shaped folding assembly; 931. upper folding assembly; 932. lower folding assembly; 933. straight-line-shaped bottom plate;
940. sliding-flipping assembly; 941. flipping drive assembly; 942. flipping extension assembly; 943. support roller; 944. second main side plate; 945. extended side plate; 946. main back plate; 947. extended back plate;
110. first adapter plate; 120. articulated shaft; 130. second adapter plate.

DETAILED DESCRIPTION OF THE EMBODIMENTS

To make the to-be-resolved technical problems, the technical solutions, and the beneficial effects of the present disclosure clearer, the present disclosure is described in further detail below with reference to the accompanying drawings and embodiments. It should be understood that the specific embodiments described herein are merely intended to explain the present disclosure, but not to limit the present disclosure.

As shown in FIG. 1 to FIG. 25, an automobile space extension mechanism includes a space extension assembly and an adapter assembly. The space extension assembly is movably installed at a tail of a compartment of automobile body 100 through the adapter assembly. In use, when rear cover 101 of the compartment is opened, the space extension assembly is unfolded backwards and downwards into a frame structure through pulling and flipping operations. An opening side of the frame structure faces the compartment of the automobile body 100 and is communicated to interior space of the compartment.

Figure 18:
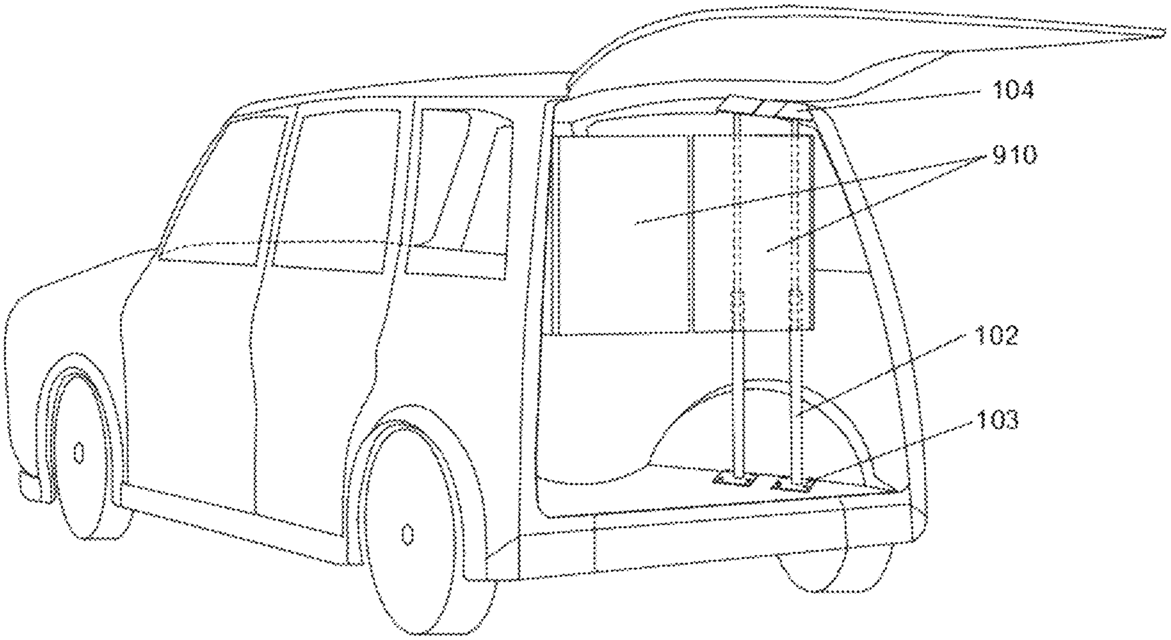
FIG. 18 schematically shows a folded state inside an automobile according to Embodiment 5 of the present disclosure.
Figure 19:
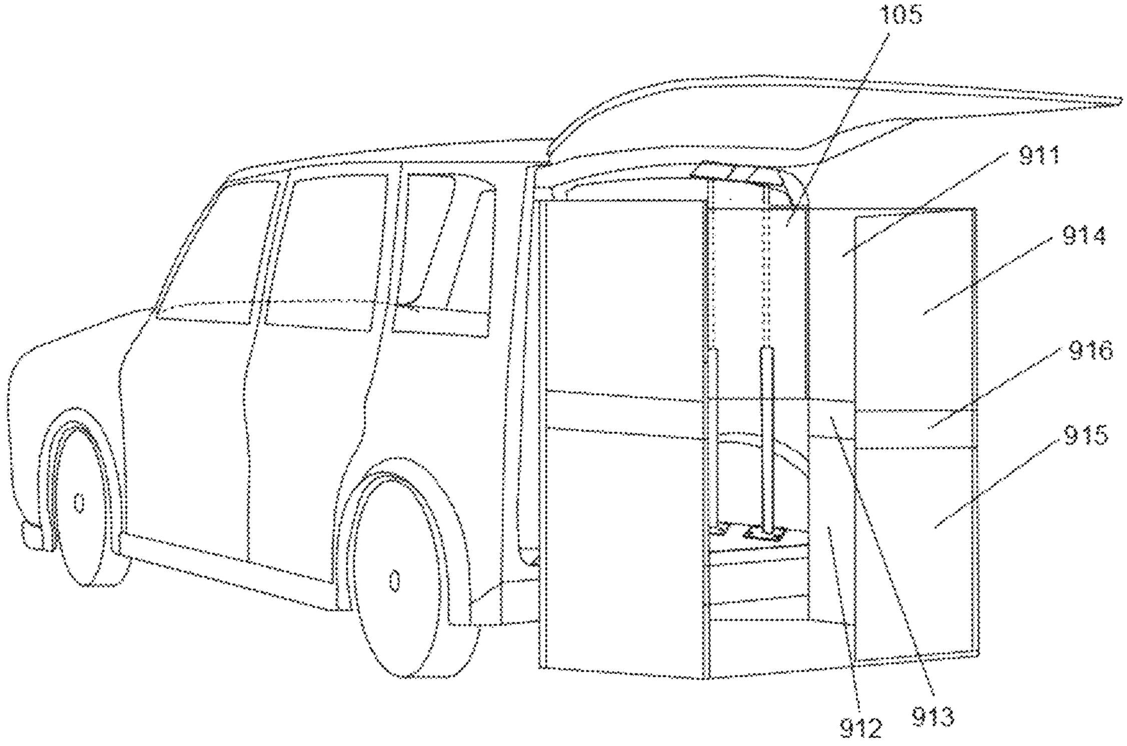
FIG. 19 schematically shows a semi-unfolded state according to Embodiment 5 of the present disclosure.
Figure 20:
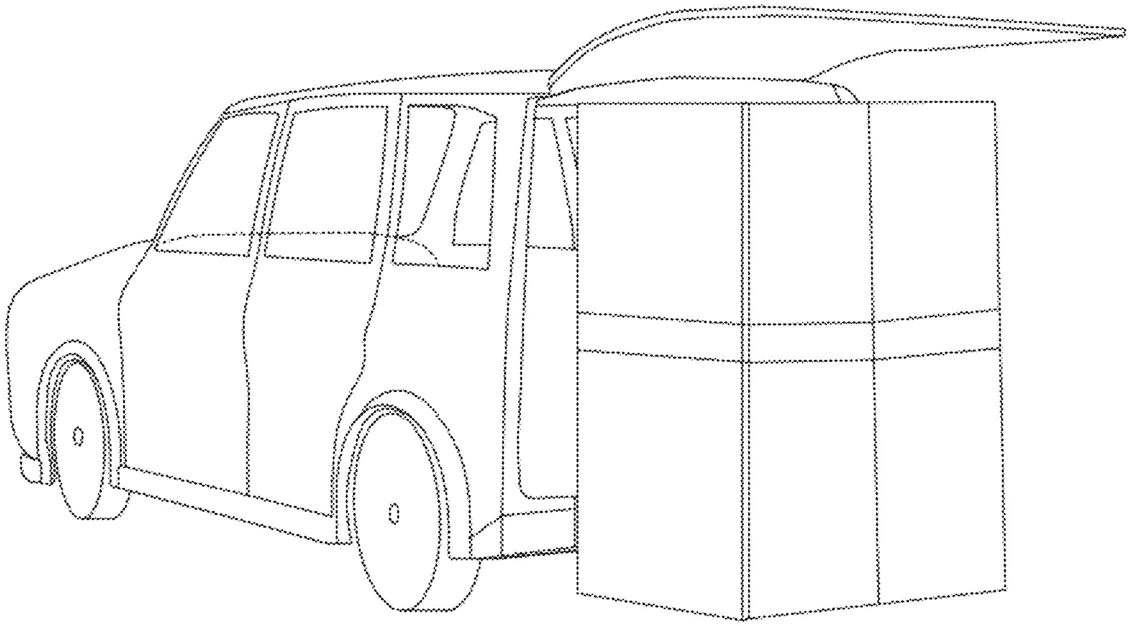
FIG. 20 schematically shows a completely unfolded state according to Embodiment 5 of the present disclosure.
Figure 21:
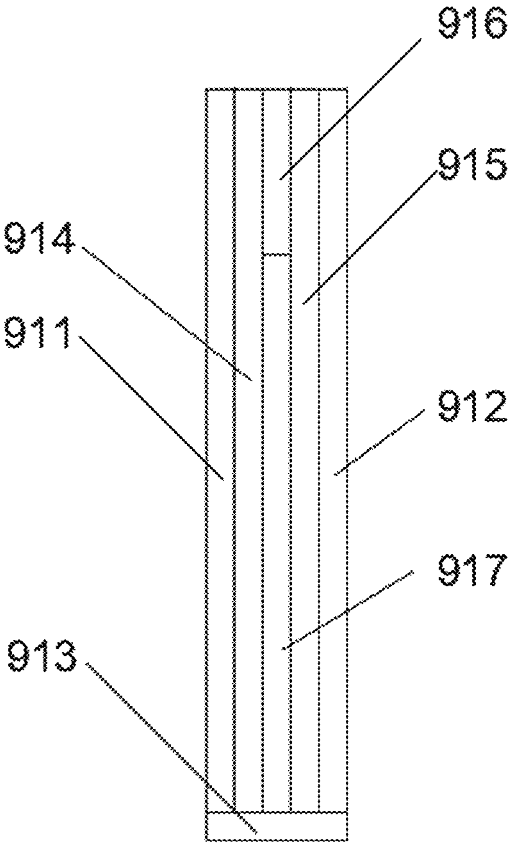
FIG. 21 is a schematic diagram of a folding structure of an articulated flipping assembly according to Embodiment 5 of the present disclosure.

Specifically, as shown in FIG. 18 and FIG. 19, the adapter assembly adopts an adaptive positioning structure. The adaptive positioning structure includes telescopic rod 102. A bottom of the telescopic rod 102 is positioned and connected to a bottom of the compartment through bottom connecting plate 103. A positioning hole of the bottom connecting plate 103 coincides with a positioning hole of a seat in an automobile, and a positioning bolt of the seat is used for synchronous fixation. A top of the telescopic rod 102 is connected to top positioning plate 104, and a top surface of the top positioning plate 104 is connected to an adaptive member. The adaptive member is made of a flexible material, and preferably is made of sponge, a polyurethane block, or a rubber block, to adapt to roofs of different shapes. An outer side of the telescopic rod 102 is connected to assembly positioning plate 105, and the assembly positioning plate 105 is provided with a plurality of positioning holes for easy use with other adapter parts.

In a specific embodiment, the space extension assembly is connected to left and right sides of the tail of the compartment of the automobile body 100 or to a top of the tail of the compartment in a sliding manner.

Specifically, the space extension assembly is connected to the left and right sides of the tail of the compartment of the automobile body 100 through slide rail connecting assembly 200 or guiding slide positioning plate 700. The slide rail connecting assembly 200 includes side guiding slide groove 201 and side slide rail 202. The side slide rail 202 is connected to the side guiding slide groove 201 in a sliding manner, the side guiding slide groove 201 is installed on the left and right sides of the tail of the compartment of the automobile body 100, and the side slide rail 202 is connected to the space extension assembly. The guiding slide positioning plate 700 is installed on the left and right sides of the tail of the compartment of the automobile body 100, and the space extension assembly is connected to a chute of the guiding slide positioning plate 700 in a sliding manner. Specifically, the side guiding slide groove 201 or the guiding slide positioning plate 700 is directly connected to the telescopic rod 102 or connected to the assembly positioning plate 105. A specific connection method can be selected based on the interior space or a combination status.

In Embodiment 1, the space extension assembly is connected to the left and right sides of the tail of the compartment of the automobile body 100 in a sliding manner through the slide rail connecting assembly 200.

As shown in FIG. 1 to FIG. 6, the space extension assembly includes side plate assembly 300, back plate assembly 400, and bottom plate 500 that are connected together.

The side plate assembly 300 includes main side plate 301, upper side plate 302, and lower side plate 303. The upper side plate 302 and the lower side plate 303 are respectively telescopically connected to two ends of the main side plate 301, and the side slide rail 202 is connected to an outer side face of the main side plate 301. Specifically, the upper side plate 302 and the lower side plate 303 are suitably connected to the main side plate 301 through a drawer-style slideway structure to achieve upward and downward pulling operations. In addition, an automatic actuator such as a linear motor or an oil cylinder can also be used to achieve linear movement, and the actuator can reduce manual labor intensity. A specific connection method can be selected based on actual needs.

The back plate assembly 400 includes upper back plate 402, main back plate 401, and lower back plate 403 that are arranged from top to bottom. The main back plate 401, the upper back plate 402, and the lower back plate 403 are respectively connected in a flippable manner to outer side edges of the main side plate 301, the upper side plate 302, and the lower side plate 303. The bottom plate 500 is connected to a bottom edge of the lower side plate 303. Specifically, the bottom plate 500 may be directly extended downwards to the ground or suspended for a short distance.

In addition, four corners of the bottom plate 500 each can also be provided with support leg 600 to increase a load-bearing capacity of the bottom plate. A specific demand for the support leg depends on an actual extension elongation of the bottom plate 500. During deployment, the support leg 600 can be quickly and detachably connected to the bottom plate 500, a position that is on a bottom surface of the bottom plate 500 and matches the support leg 600 is provided with a positioning groove, facilitating quick installation of the support leg. In addition, a magnet can also be placed in the positioning groove to ensure stability of the connection.

Specifically, the support leg 600 is set as a height adjustable structure, including an upper positioning leg and a lower telescopic leg. A top of the telescopic leg is embedded into a central positioning hole of the positioning leg and is locked and positioned by a vertically arranged limiting pin.

Specifically, the bottom plate 500 adopts a double-plate structure. In this case, the bottom plate 500 is connected in a flippable manner to the bottom edge of the lower side plate 303 through third rotary connector 501.

The main back plate 401 is hinged on the outer side edge of the main side plate 301 through second rotary connector 405, and both the upper back plate 402 and the lower back plate 403 are connected to the outer side edges of the upper side plate 302 and the lower side plate 303 through first rotary connector 404. The upper back plate 402 and the lower back plate 403 are flipped and then folded together with the upper side plate 302 and the lower side plate 303, and the main back plate 401 is flipped and then parallel to the main side plate 301, with a storage gap reserved in the middle. A thickness of the storage gap matches a total thickness of the folded upper side plate 302, lower side plate 303, upper back plate 402, and lower back plate 403.

Specifically, the first rotary connector 404 and the third rotary connector 501 may be 0° to 90° open/close hinge structures. The second rotary connector 405 is also a 90° open/close hinge. A connection position needs to be adjusted adaptively to ensure that a certain gap is reserved in an overlapping state (parallel to the main back plate), and ensure stacking flatness of all plates. In addition, the first rotary connector 404, the second rotary connector 405, and the third rotary connector 501 each can be replaced with flexible connector 908, and a distance between the plates can be adjusted adaptively. A combined structure of a hinge structure and a single-sided flexible connector can also be used to ensure connection strength and sealing performance.

Figure 15:
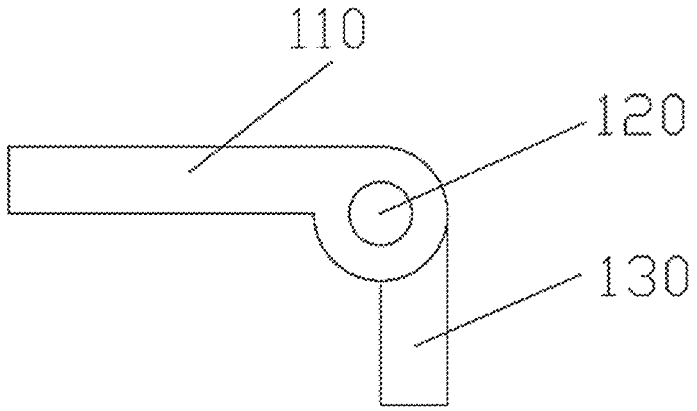
FIG. 15 is a schematic structural diagram of a hinge structure according to the present disclosure.

Specifically, as shown in FIG. 15, a hinge includes two adapter plates and one articulated shaft 120. First adapter plate 110 and second adapter plate 130 are sleeved on a same articulated shaft 120 in a crossed or side-by-side manner, and a limiting-specific spring or step needs to be set to position a rotation angle. In addition, lengths of the first adapter plate 110 and the second adapter plate 130 are different and can be adjusted based on an actual folded state after rotation. When a gap needs to be reserved, one of the adapter plates can be made long. When no gap needs to be reserved, the adapter plates can be designed to have an equal length.

Inner side faces of upper and lower ends of the main side plate 301 are provided with avoidance steps, and a depth of the avoidance step is not less than a total height of the upper side plate 302 and the lower side plate 303. A total height of the upper back plate 402 and the lower back plate 403 is not greater than a maximum total height of the upper side plate 302 and the lower side plate 303.

Figure 16:
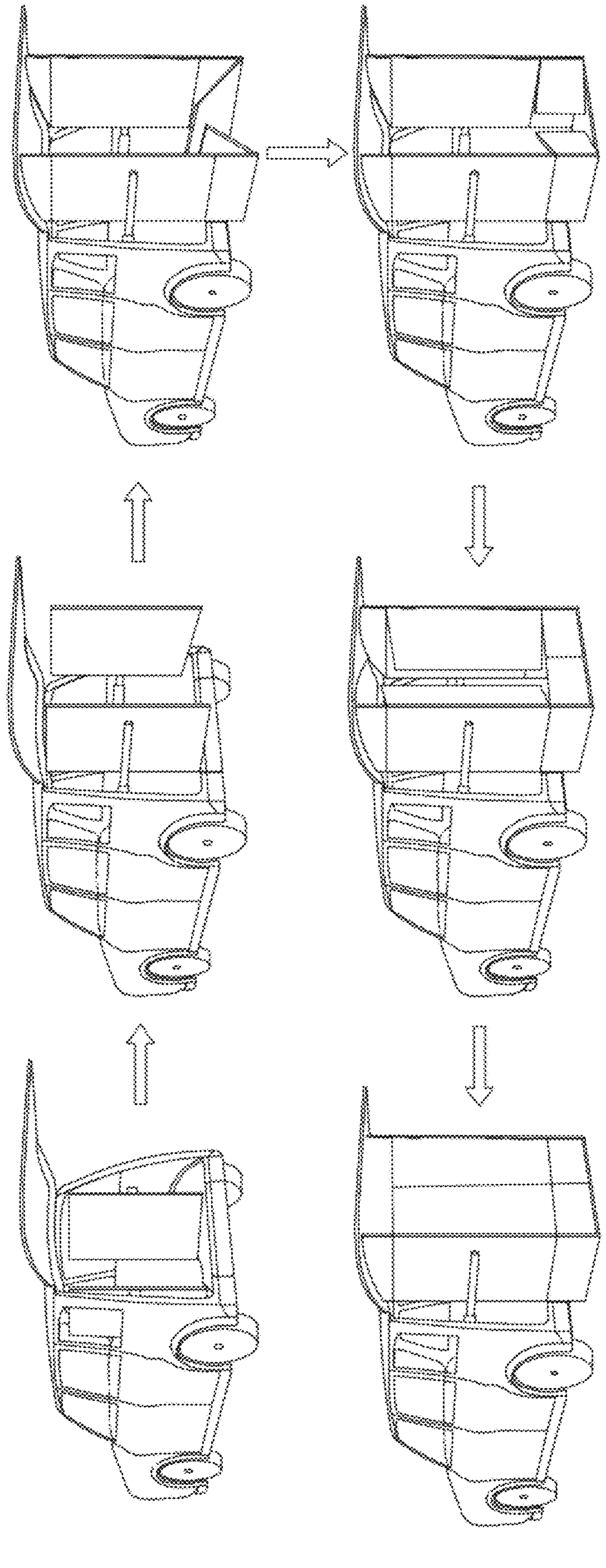
FIG. 16 is schematic diagram of a use procedure of Embodiment 1 of the present disclosure.

As shown in FIG. 16, a use procedure of this embodiment is as follows:

Step 1: The rear cover 101 of the compartment is opened.

Step 2: The space extension assembly slides outwards, and the main side plate 301 drives all parts to slide outwards along the side guiding slide groove 201 under movement of the side slide rail 202. In an initial state, the side plate assembly 300, the back plate assembly 400, and the bottom plate 500 are folded into two symmetrical groups located inside the compartment.

Step 3: The space extension assembly is unfolded, which mainly includes following steps:

1) The upper side plate 302 and the lower side plate 303 drive the folded upper back plate 402 and lower back plate 403 to extend towards upper and lower sides simultaneously.
2) The bottom plate 500 is flipped downwards to achieve a horizontal state.
3) The lower back plate 403 is flipped outwards to be perpendicular to the lower side plate 303.
4) The main back plate 401 is flipped outwards to be perpendicular to the main side plate 301.
5) The upper back plate 402 is flipped outwards to be perpendicular to the upper side plate 302.

Step 4: The support leg is installed. The bottom four corners of the bottom plate 500 each are provided with a groove that matches the support leg. The support leg 600 is directly placed vertically in the groove, adjusted to an appropriate height, and then locked. A bottom end of the support leg is stably supported on the ground.

Upon the above four steps, the space extension assembly can be unfolded, while reverse operations can be performed to accommodate the space extension assembly.

In Embodiment 2, the space extension assembly is connected to the left and right sides of the tail of the compartment of the automobile body 100 through the slide rail connecting assembly 200.

Figure 7:
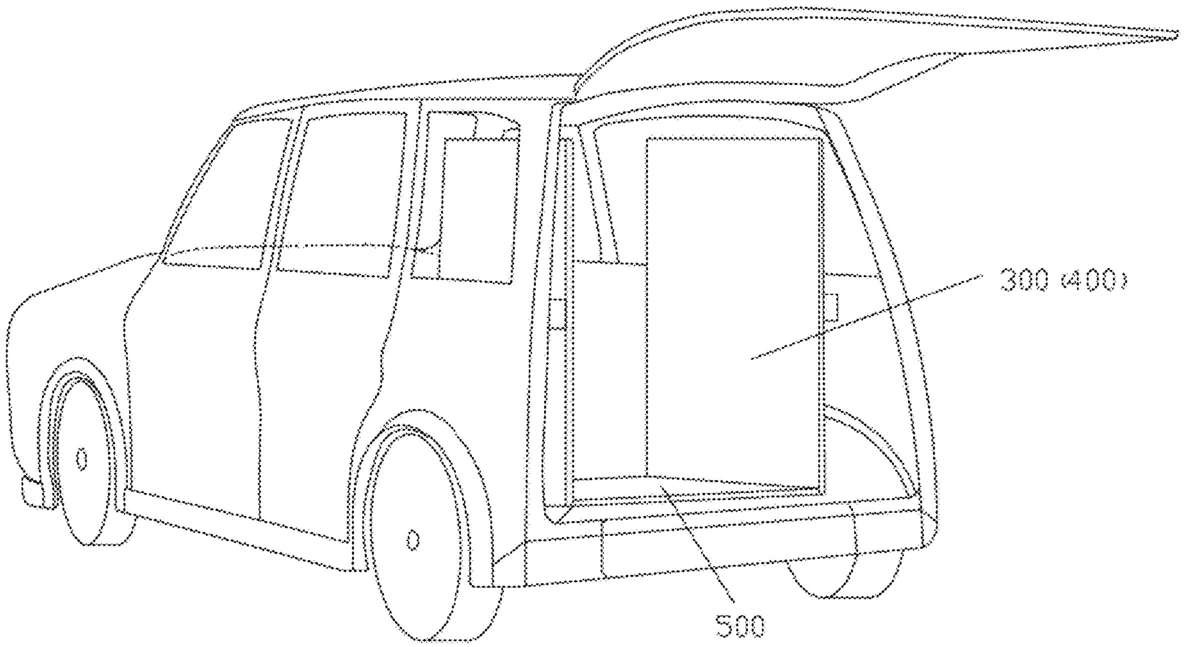
FIG. 7 schematically shows a folded state of an automobile space extension mechanism inside an automobile according to the present disclosure (Embodiment 2)
Figure 8:
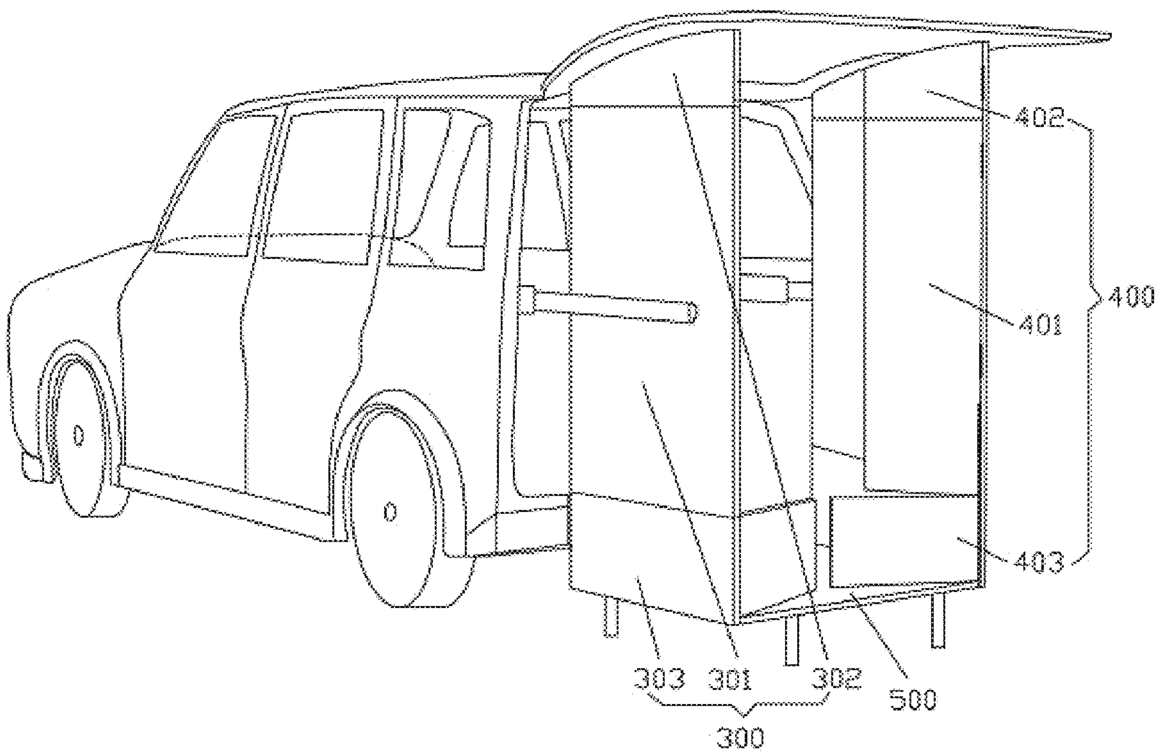
FIG. 8 schematically shows a status in a process of unfolding an automobile space extension mechanism according to the present disclosure (Embodiment 2)
Figure 9:
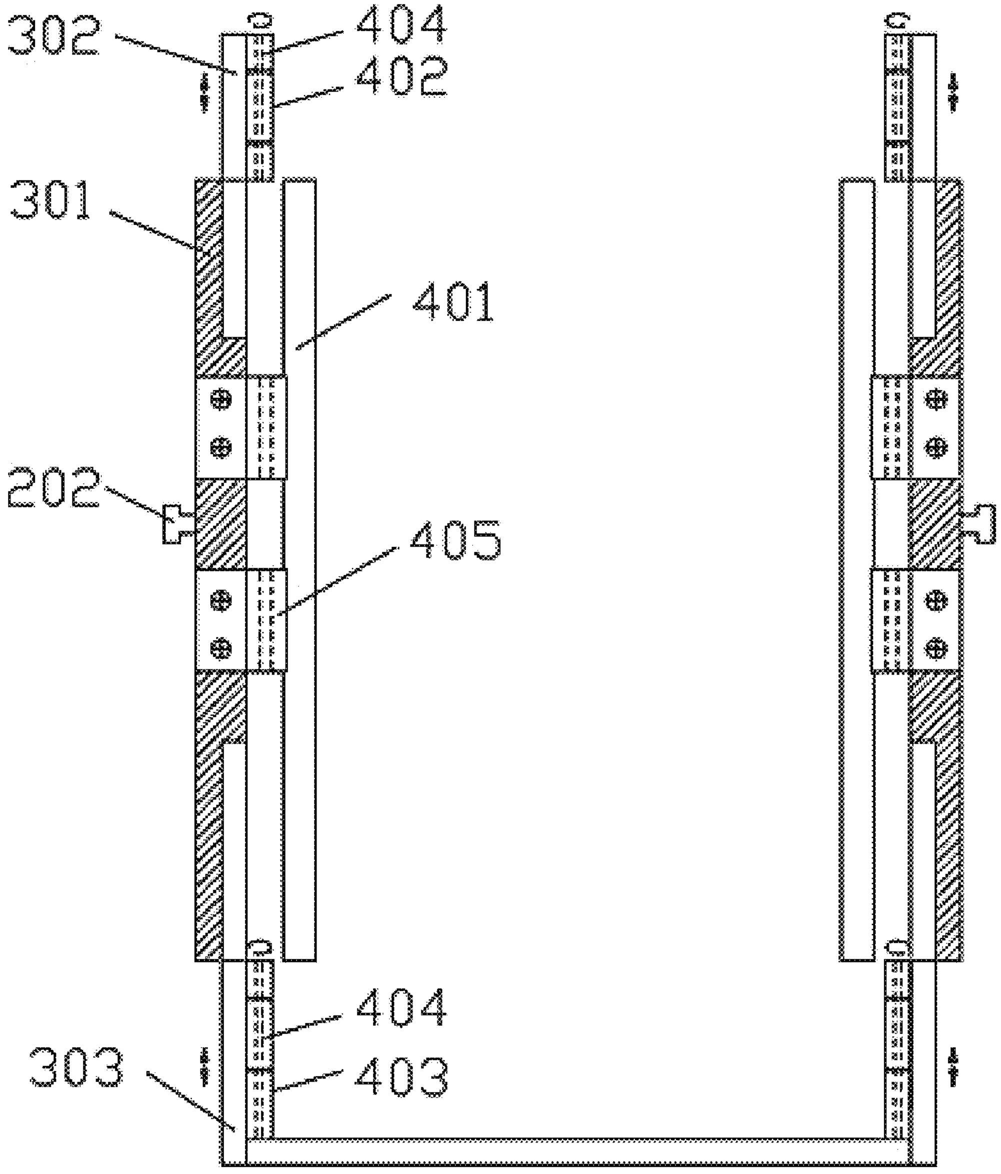
FIG. 9 is a side view of a pulled folding assembly according to Embodiment 2 of the present disclosure.

As shown in FIG. 7 to FIG. 9, an overall structure is similar to that in Embodiment 1, except that the bottom plate 500 has a different structure. The bottom plate 500 adopts a single-plate structure, and two ends of the bottom plate 500 are connected to bottom edges of two lower side plates 303 through screws.

Operation steps in this embodiment are similar to those in Embodiment 1, except for the substeps 1) and 2) in the step 3. The bottom plate 500 of the single-plate structure is synchronized in place with stretching of the lower side plate 303, without a need for a second flipping process.

Figure 10:
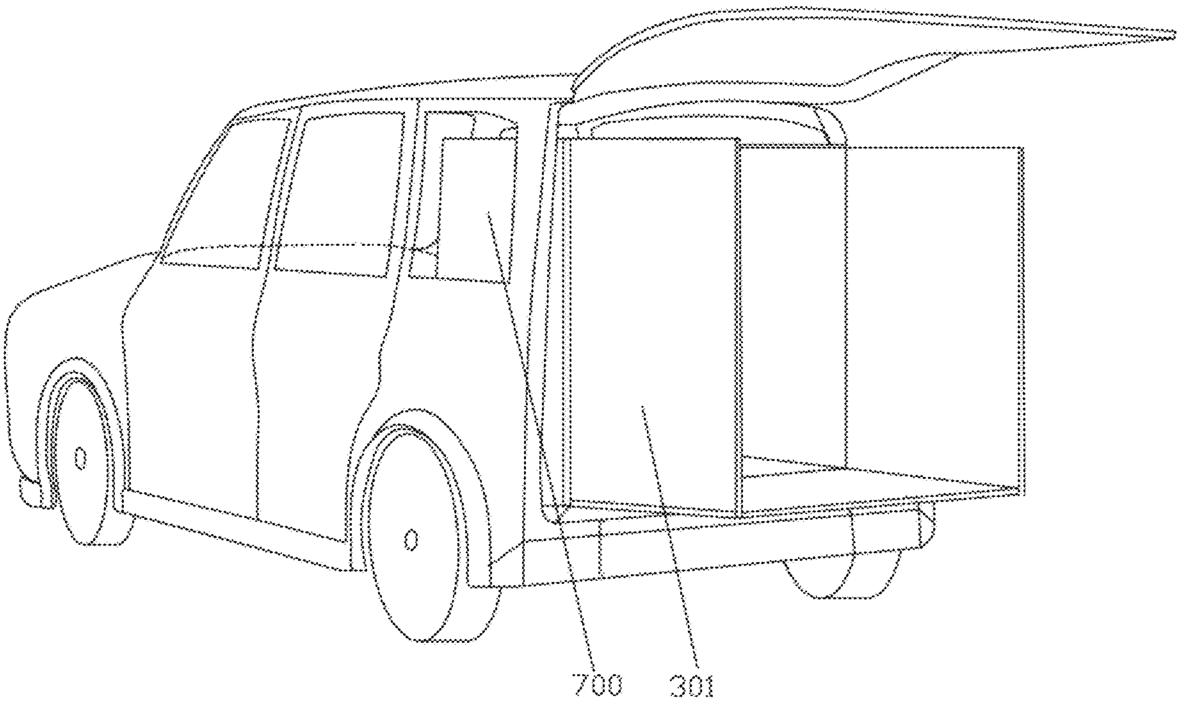
FIG. 10 schematically shows a folded state of an automobile space extension mechanism inside an automobile according to the present disclosure (Embodiment 3)
Figure 11:
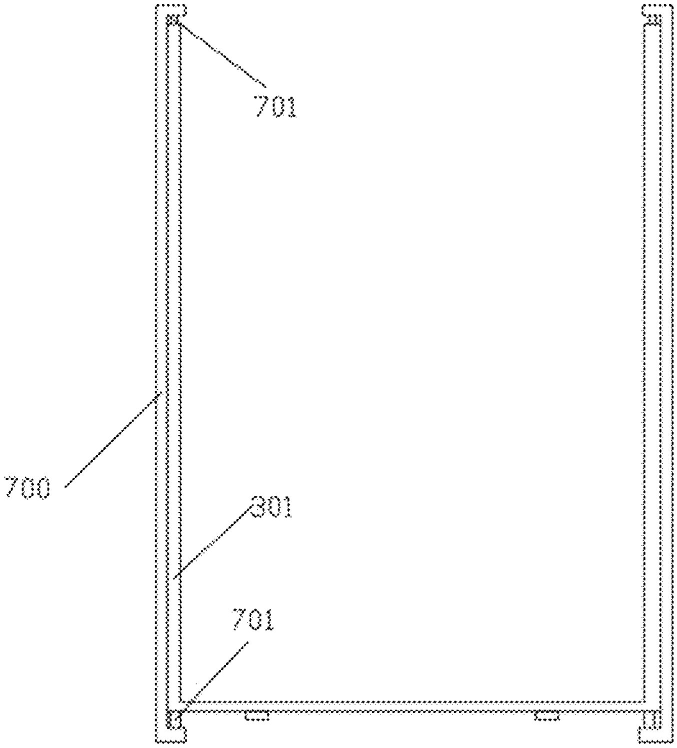
FIG. 11 is a schematic diagram of a connecting structure of a guiding slide positioning plate according to Embodiment 3 of the present disclosure.
Figure 12:
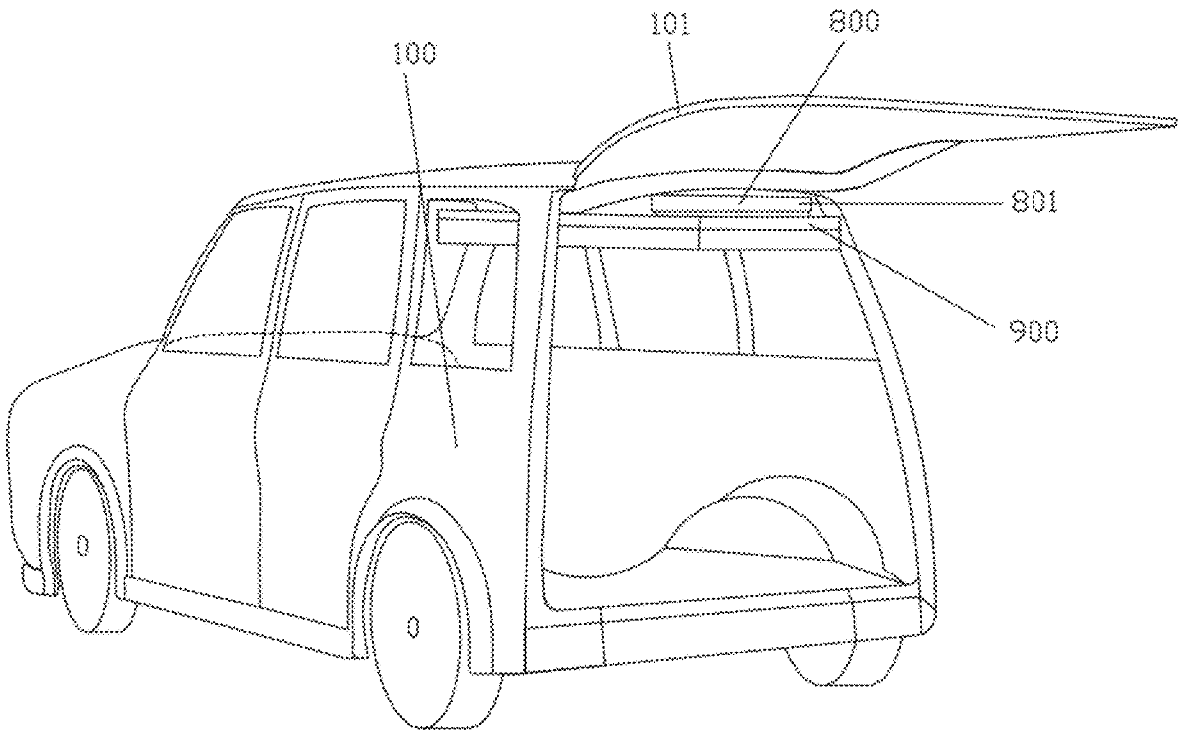
FIG. 12 schematically shows a folded state of an automobile space extension mechanism inside an automobile according to the present disclosure (Embodiment 4)
Figure 13:
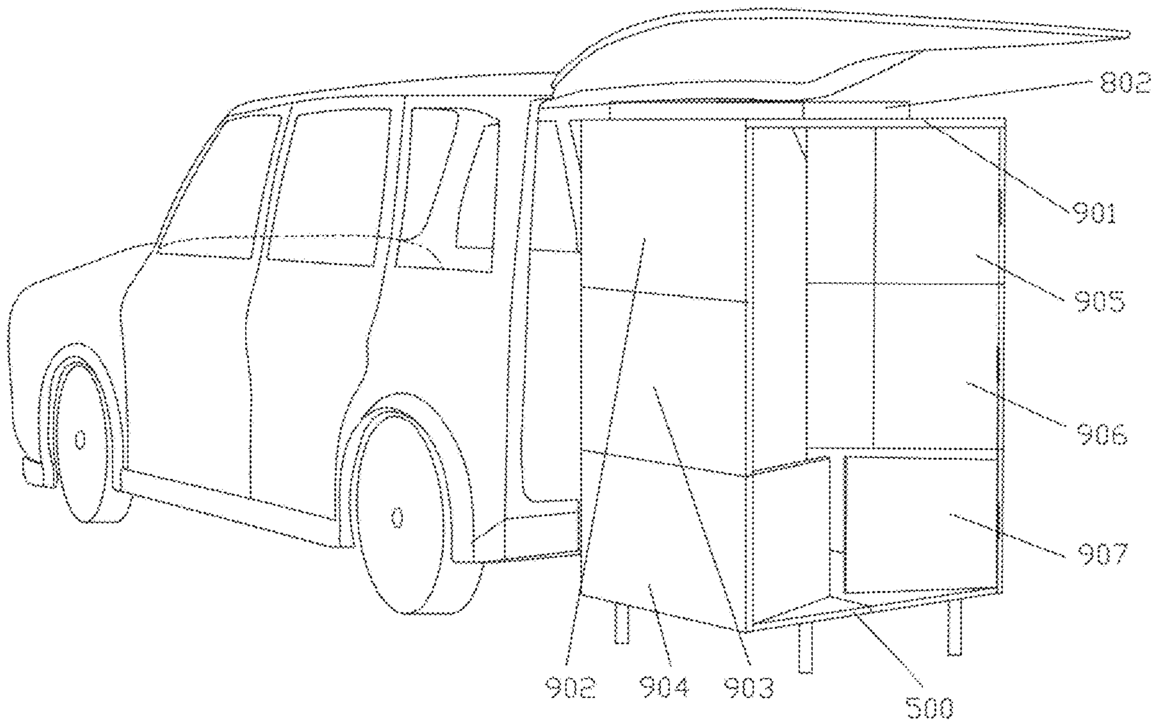
FIG. 13 schematically shows a status in a process of unfolding an automobile space extension mechanism according to the present disclosure (Embodiment 4)
Figure 14:
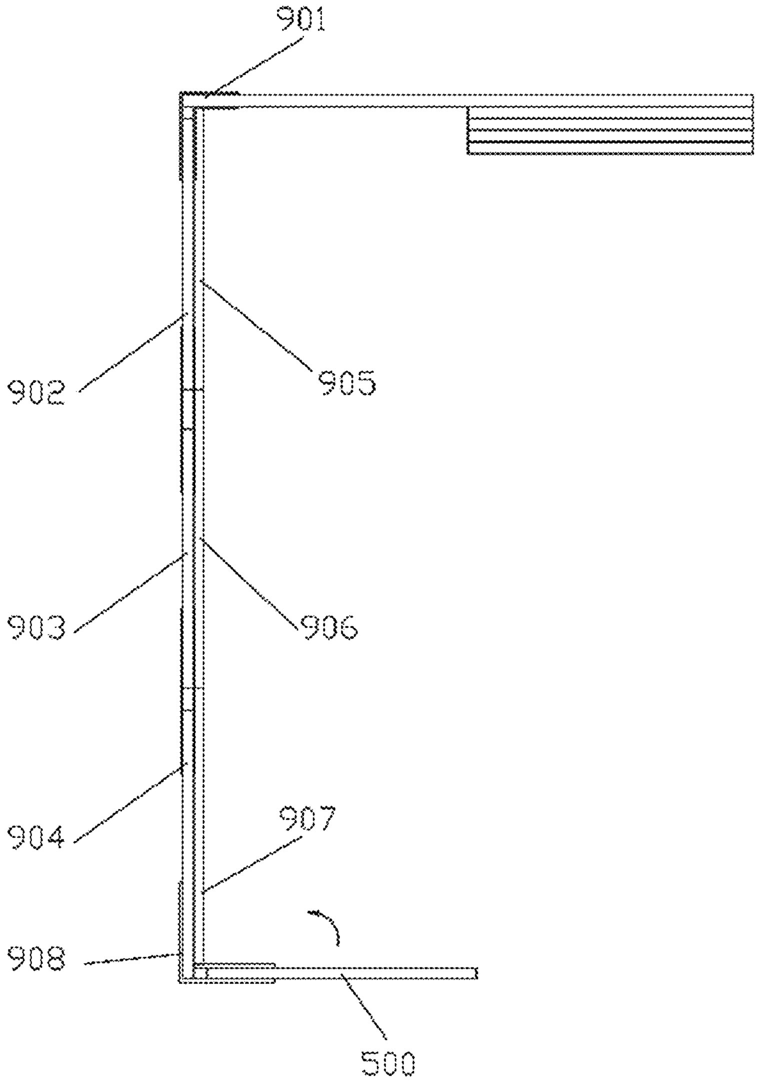
FIG. 14 is a side view of a lifted folding assembly according to Embodiment 4 of the present disclosure.

In Embodiment 3, as shown in FIG. 10 and FIG. 11, an overall structure is similar to that in Embodiment 1, except that the adapter assembly has a different structure. The space extension assembly is connected to the left and right sides of the tail of the compartment of the automobile body 100 through the guiding slide positioning plate 700. The guiding slide positioning plate 700 is installed on the left and right sides of the tail of the compartment of the automobile body 100, and the space extension assembly is connected to the chute of the guiding slide positioning plate 700 in a sliding manner.

Operation steps in this embodiment are the same as those in Embodiment 1, except that in the step 2, the space extension assembly slides outwards, and the main side plate 301 drives all the parts to slide outwards along the guiding slide positioning plate 700. Specifically, the two ends of the main side plate 301 are connected to rollers 701 or sliders to achieve fast sliding, which making the operation more convenient, time-saving, and labor-saving.

In Embodiment 4, as shown in FIG. 12 to FIG. 15, the space extension assembly is of a lifted structure.

Specifically, the space extension assembly is connected to the top of the tail of the compartment of the automobile body 100 through lifted guiding slide assembly 800, and the lifted guiding slide assembly 800 includes upper guiding slide groove 801 and upper guiding slide plate 802 that are connected together in a sliding manner. The upper guiding slide groove 801 is installed on the top of the tail of the compartment of the automobile body 100, and the upper guiding slide plate 802 is installed on the space extension assembly.

During lifting, the space extension assembly is set as lifted folding assembly 900, and the lifted folding assembly 900 includes upper connecting plate 901, a folding side plate assembly, and a folding back plate assembly. A top surface of the upper connecting plate 901 is connected to the upper guiding slide groove 801 through the upper guiding slide plate 802 in a sliding manner. Two folding side plate assemblies are symmetrically arranged and connected to left and right side edges of the upper connecting plate 901, and the folding back plate assembly is connected in a flippable manner to the folding side plate assembly.

The folding side plate assembly includes upper folding side plate 902, intermediate folding side plate 903, and lower folding side plate 904 that are sequentially folded and connected together. One side edge of the upper folding side plate 902 is connected to a side edge of the upper connecting plate 901, and edges connecting the upper folding side plate 902, the intermediate folding side plate 903, and the lower folding side plate 904 are connected together through a 180° hinge structure or the flexible connector 908.

The folding back plate assembly includes upper folding back plate 905, intermediate folding back plate 906, and lower folding back plate 907. The upper folding back plate 905, the intermediate folding back plate 906, and the lower folding back plate 907 are respectively connected to outer side edges of the upper folding side plate 902, the intermediate folding side plate 903, and the lower folding side plate 904 through a 90° hinge structure or the flexible connector 908.

When the upper folding side plate 902, the intermediate folding side plate 903, the lower folding side plate 904, the upper folding back plate 905, the intermediate folding back plate 906, the lower folding back plate 907, and the bottom plate are all connected by using a sheet material of a certain thickness, corresponding articulation piece avoidance positions need to be reserved to ensure flatness after folding. In addition, a corresponding positioning member is disposed, and locking members are disposed at edges that are of two folding side plates 902 and close to each other. After overlapping, the locking members on two sides are directly connected for locking and positioning. Specifically, the locking members may be a set of magnets, snap fasteners, or adhesive hook and cloth members.

Specifically, the folding side plate assembly and the folding back plate assembly may be made of the flexible material, and an appropriate fitting gap and an appropriate width are reserved for a flipping and folding position to ensure the flatness after the folding. To reduce a weight of the member, a cylindrical material can also be used for easy accommodation and integration.

The bottom plate 500 is further included. The bottom plate 500 adopts the double-plate structure, and the bottom plate 500 is connected in a flippable manner to a bottom edge of the lower folding side plate 904 through the 90° hinge structure or the flexible connector 908. In addition, the four corners of the bottom plate 500 each can also be provided with the support leg 600, and the support leg 600 can be quickly and detachably connected to the bottom plate 500. The specific demand for the support leg depends on the actual extension elongation of the bottom plate 500.

Figure 17:
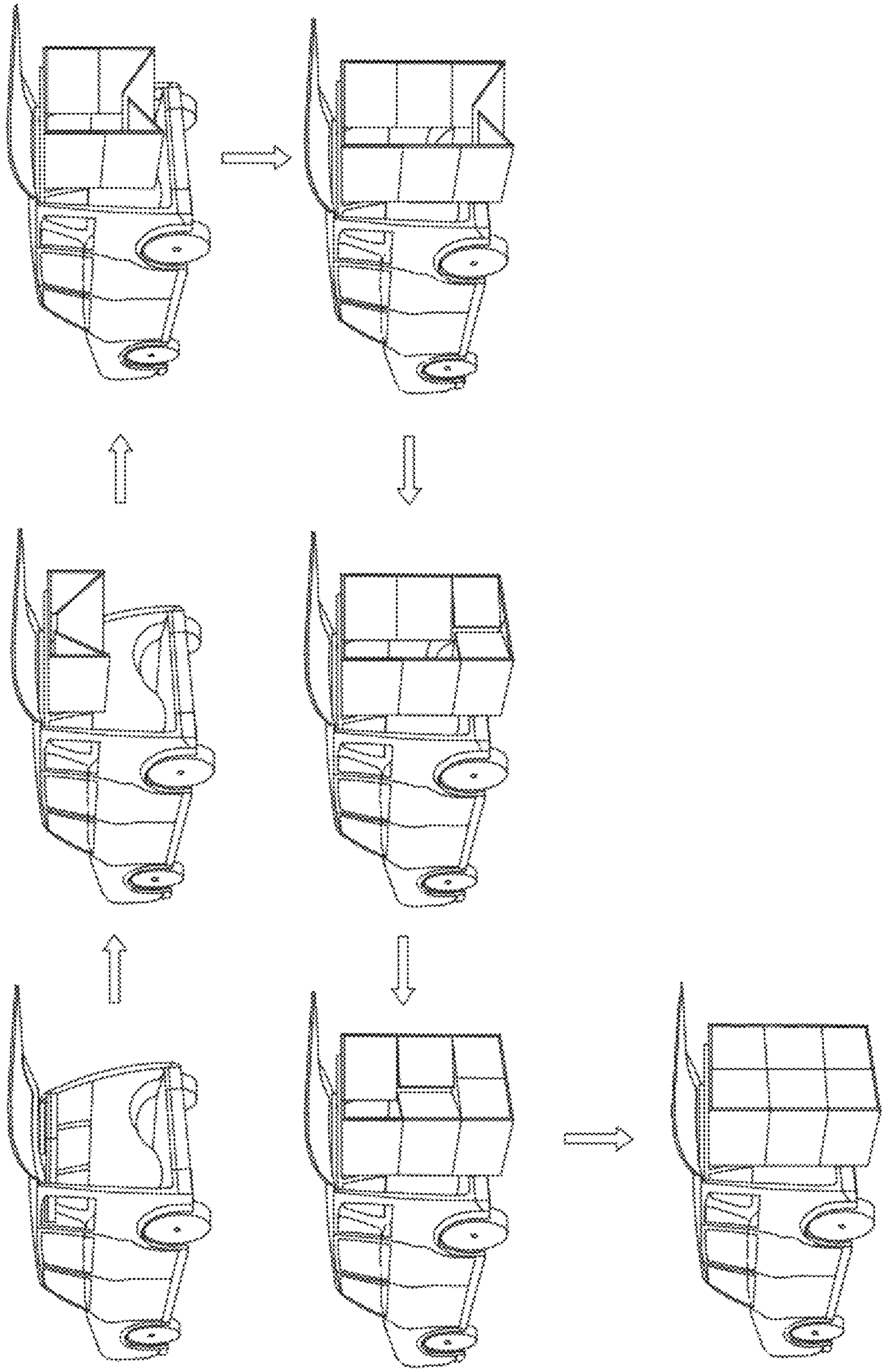
FIG. 17 is a schematic diagram of a use procedure of Embodiment 4 of the present disclosure.

As shown in FIG. 17, a use procedure of this embodiment is as follows:

Step 1: The rear cover 101 of the compartment is opened.

Step 2: The lifted folding assembly 900 slides outwards. The upper guiding slide plate 802 on the top surface of the upper connecting plate 901 slides outwards along the guiding slide groove 801 on the top of the compartment. In the initial state, the lifted folding assembly 900 is folded and located at the top of the compartment.

Step 3: The lifted folding assembly 900 is unfolded, which mainly includes following steps:

1) The upper folding side plate 902 is flipped downwards by 90° to achieve a vertical state.
2) The intermediate folding side plate 903 is flipped downwards by 180° to achieve the vertical state.
3) The lower folding side plate 904 is flipped downwards by 180° to achieve the vertical state.
4) The bottom plate 500 is flipped downwards by 90° to achieve the horizontal state.
5) The lower folding back plate 907 is flipped outwards by 90° to be perpendicular to the lower folding side plate 904.
6) The intermediate folding back plate 906 is flipped outwards by 90° to be perpendicular to the intermediate folding side plate 903.
7) The upper folding back plate 905 is flipped outwards by 90° to be perpendicular to the upper folding side plate 902.

Step 4: The support leg is installed. The bottom four corners of the bottom plate 500 each are provided with the groove that matches the support leg. The support leg 600 is directly placed vertically in the groove, adjusted to the appropriate height, and then locked. The bottom end of the support leg is stably supported on the ground.

Upon the above four steps, the lifted folding assembly 900 (space extension assembly) can be unfolded, while reverse operations can be performed to accommodate the lifted folding assembly 900.

In Embodiment 5, as shown in FIG. 18 to FIG. 21, the space extension assembly is of an articulated flippable structure.

The space extension assembly is designed as articulated flipping assembly 910, and the articulated flipping assembly 910 is connected in a flippable manner to the assembly positioning plate 105 through the hinge. In a folded state, two assembly positioning plates 105 are symmetrically and vertically placed and approximately parallel to the rear cover 101 of the compartment.

Specifically, the articulated flipping assembly 910 includes a flippable side plate assembly, a flippable back plate assembly, and flippable bottom plate 917. The flippable side plate assembly includes main positioning plate 911 and lower flippable side plate 912. An inner side edge of the main positioning plate 911 is hinged on the assembly positioning plate 105. Side intermediate transition plate 913 is hinged between the main positioning plate 911 and the lower flippable side plate 912, and adjacent edges of the main positioning plate 911, the lower flippable side plate 912, and the side intermediate transition plate 913 are connected together through a 90° articulation piece. The flippable back plate assembly includes rear upper flippable plate 914 and rear lower flippable plate 915. The rear upper flippable plate 914 is hinged on an outer vertical edge of the main positioning plate 911, and the rear lower flippable plate 915 is hinged on an outer vertical edge of the lower flippable side plate 912. A bottom edge of the rear upper flippable plate 914 is hinged on a rear intermediate transition plate 916, and the flippable bottom plate 917 is hinged on a bottom edge of the rear lower flippable plate 915. A width of the rear intermediate transition plate 916 is consistent with that of the side intermediate transition plate 913, and a total thickness of the folded main positioning plate 911, lower flippable side plate 912, upper flippable plate 914, lower flippable plate 915, and flippable bottom plate 917 is equivalent the width of the side intermediate transition plate 913.

A use procedure of this embodiment is as follows:

Step 1: The rear cover 101 of the compartment is opened.

Step 2: Two symmetrical articulated flippable assemblies 910 rotate outwards by 90° to unfold. In the initial state, the articulated flipping assembly 910 is folded together and is located at a rear part of the compartment.

Step 3: The articulated flipping assembly 910 is unfolded, which mainly includes following steps:

1) The lower flippable side plate 912 and the side intermediate transition plate 913 are synchronously flipped downwards by 90°, such that the side intermediate transition plate 913 is in the vertical state. Afterwards, the lower flippable side plate 912 is continuously flipped downwards by 90°, such that the lower flippable side plate 912 is in the vertical state.
2) The rear upper flippable plate 914 is rotated outwards by 90° or 270° to be perpendicular to the main positioning plate 911, and then the rear intermediate transition plate 916 on the bottom edge is flipped downwards by 90° to be perpendicular to the side intermediate transition plate 913.
3) The rear lower flippable plate 915 is rotated outwards by 90° to be perpendicular to the lower flippable side plate 912.
4) The flippable bottom plate 917 is flipped downwards by 90° to achieve the horizontal state.

Step 4: The articulated flipping assembly 910 on the other side is unfolded synchronously.

Upon the above four steps, the articulated flipping assembly 910 (space extension assembly) can be unfolded, while reverse operations can be performed to accommodate the articulated flipping assembly 910.

A specific folding and flipping method can be adjusted based on actual needs, not limited to the above single embodiment.

Figure 22:
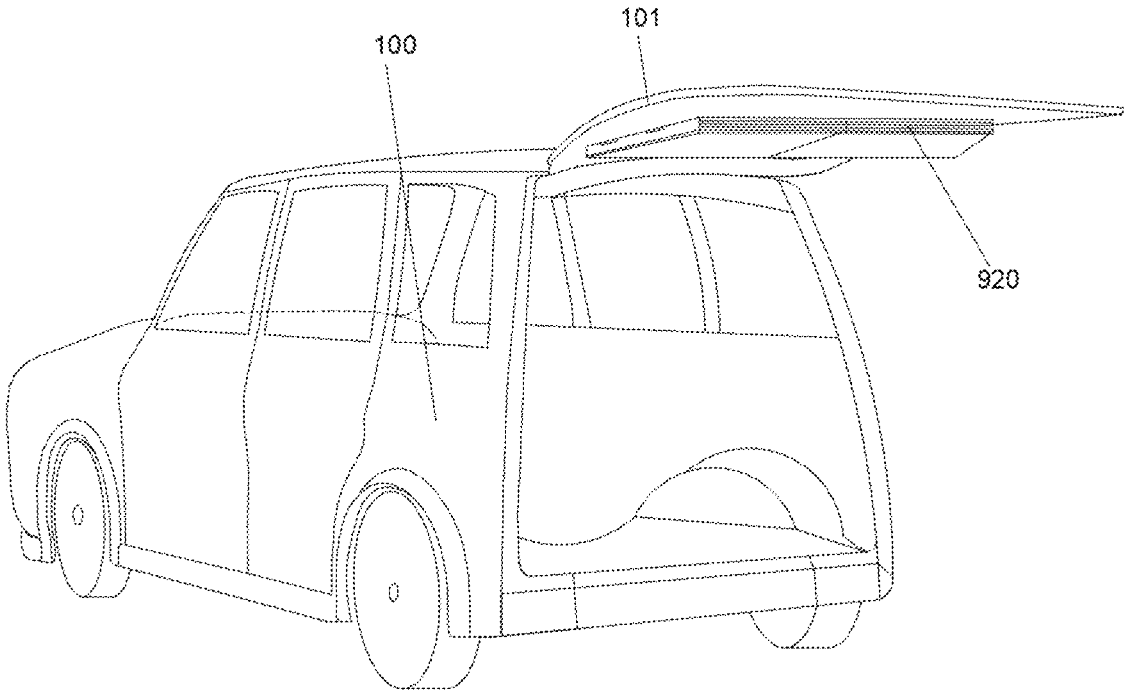
FIG. 22 schematically shows a folded state inside an automobile according to Embodiment 6 of the present disclosure.
Figure 23:
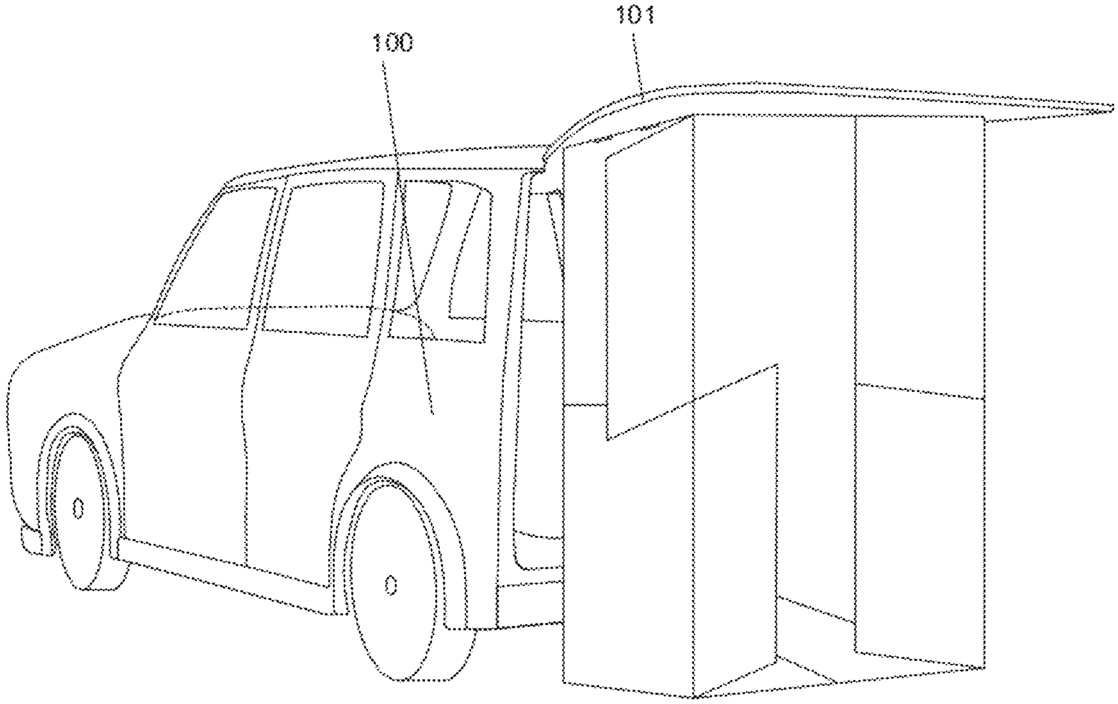
FIG. 23 is a schematic diagram in an unfolding process according to Embodiment 6 of the present disclosure.
Figure 24:
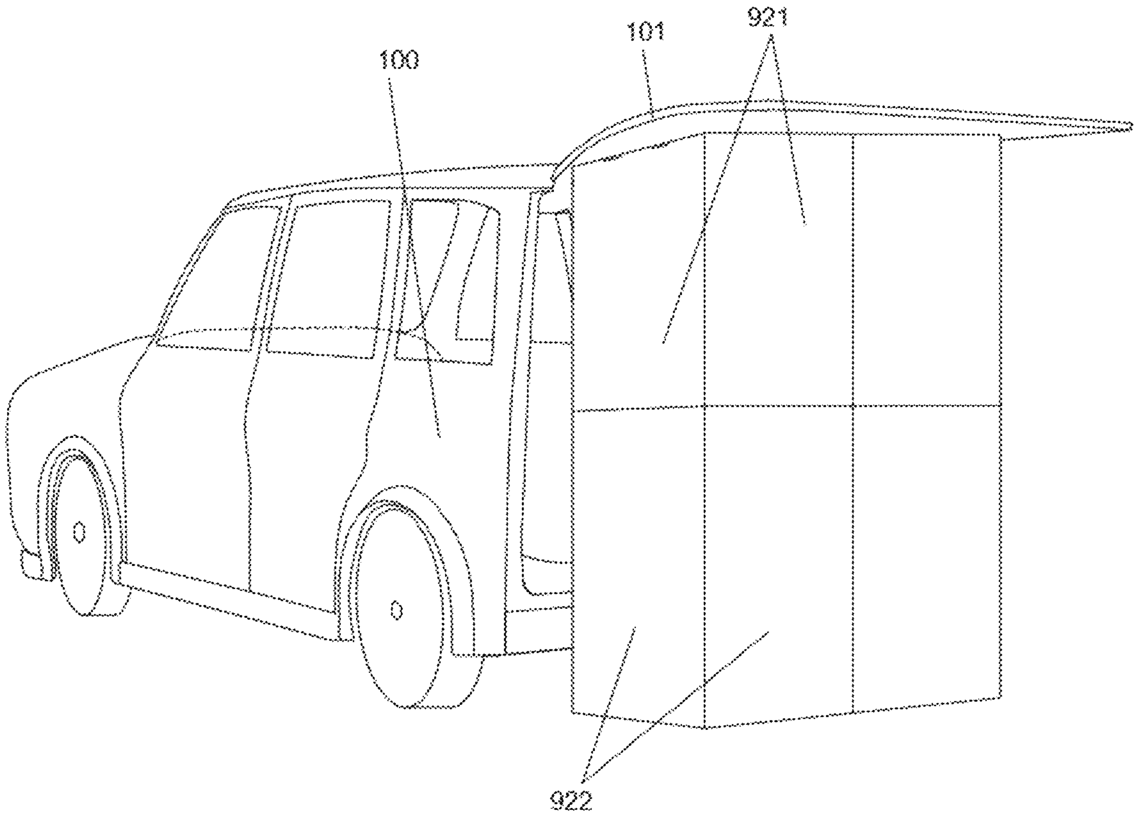
FIG. 24 schematically shows an unfolded state according to Embodiment 6 of the present disclosure.

In Embodiment 6, as shown in FIG. 22 to FIG. 24, the space extension assembly is of a roof folding extension structure.

The space extension assembly is designed as roof folding extension assembly 920, and the roof folding extension assembly 920 includes upper assembly 921 and lower assembly 922. The upper assembly 921 includes an upper side plate and an upper back plate that are hinged together, with a left side edge of the upper side plate hinged on the rear cover 101 of the compartment. The lower assembly 922 includes a lower side plate, a lower back plate, and a bottom plate, and the three plates are hinged together based on corresponding edges after the three plates are flipped. The lower side plate and the upper side plate are articulated or pulled together, and are in a stacked state when not unfolded and are of a frame structure when unfolded.

Referring to other embodiments, a use procedure of this embodiment is simply as follows: Firstly, the rear cover 101 of the compartment is opened. Then the upper assembly 921 is flipped to achieve the vertical state, and the lower assembly 922 is continuously flipped or stretched to achieve the vertical state and located below the upper assembly 921. Finally, the upper back plate, the lower back plate, and the bottom plate are flipped based on an articulation relationship until they are completely unfolded to form a frame structure. An opening side of the frame structure faces the compartment of the automobile body 100 and is communicated to the interior space of the compartment. Finally, opposite plates are locked and positioned through an auxiliary positioning piece.

Upon the above steps, the roof folding extension assembly 920 (space extension assembly) can be unfolded, while reverse operations can be performed to accommodate the roof folding extension assembly 920.

Figure 25:
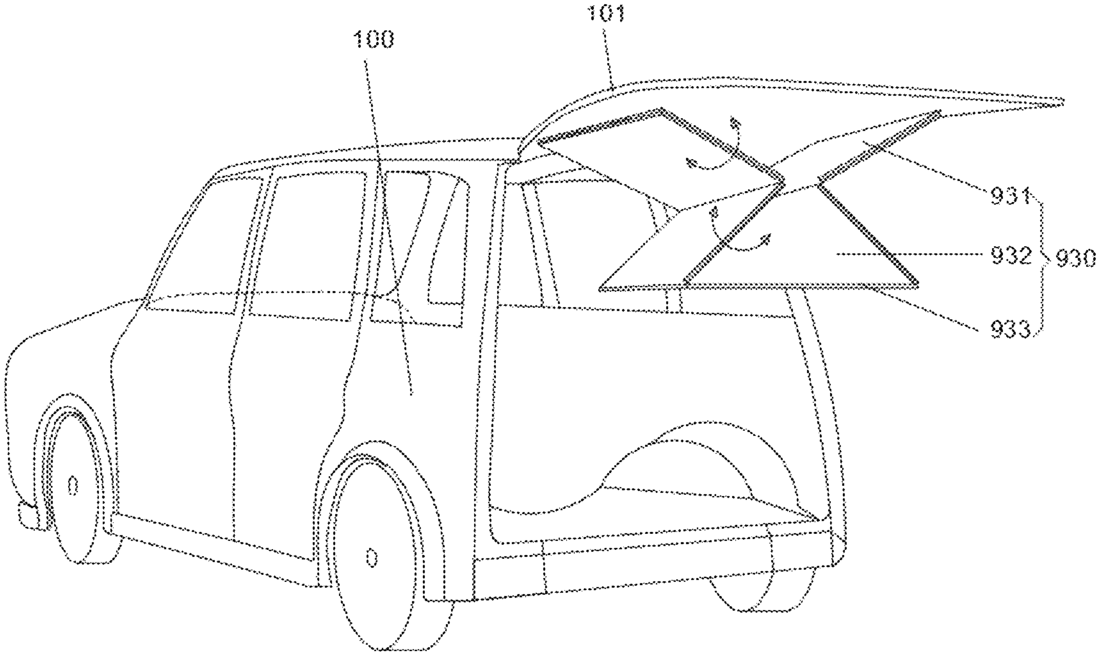
FIG. 25 schematically shows a semi-unfolded state according to Embodiment 7 of the present disclosure.

In Embodiment 7, as shown in FIG. 25, the space extension assembly is of a Z-shaped folding structure.

Specifically, in this embodiment, the space extension assembly is designed as roof Z-shaped folding assembly 930, and the roof Z-shaped folding assembly 930 includes upper folding assembly 931, lower folding assembly 932, and straight-line-shaped bottom plate 933. The upper folding assembly 931 includes an upper side plate and an upper back plate that are connected in a flippable manner together, with a left side edge of the upper side plate hinged on the rear cover 101 of the compartment. The lower folding assembly 932 includes a lower side plate and a lower back plate that are hinged together. Left and right edges of two symmetrical lower side plates are connected to the straight-line-shaped bottom plate 933, and the three plates are hinged together based on corresponding edges after the three plates are flipped. Edges that are of the lower side plate and the upper side plate and close to each other are hinged together, and the lower side plate and the upper side plate are in the stacked state when not unfolded, are Z-shaped during unfolding, and are of a frame structure when completely unfolded.

A use procedure of this embodiment is simply as follows: Firstly, the rear cover 101 of the compartment is opened. Then the straight-line-shaped bottom plate 933 is unfolded downwards to drive the lower folding assembly 932 and the upper folding assembly 931 to unfold downwards to achieve the vertical state. After that, the upper side plate and the lower side plate are upright and perpendicular to the straight-line-shaped bottom plate 933. Then the articulated and folded upper back plate and lower back plate are flipped clockwise or counterclockwise to be unfolded to corresponding positions perpendicular to the upper side plate and the lower side plate. The lower folding assembly 932 and the upper folding assembly 931 are of a frame structure after being completely unfolded, and an opening side of the frame structure faces the compartment of the automobile body 100 and is communicated to the interior space of the compartment. Finally, opposite plates are locked and positioned through the auxiliary positioning piece.

Upon the above steps, the roof Z-shaped folding assembly 930 (space extension assembly) can be unfolded, while reverse operations can be performed to accommodate the roof Z-shaped folding assembly 930.

Specifically, the space extension assemblies in Embodiment 6 and Embodiment 7 are hinged on the rear cover 101 of the compartment, which does not occupy the interior space and has a small impact on storage and accommodation functions of the compartment. This makes it more convenient to modify an existing automobile structure.

Figure 26:
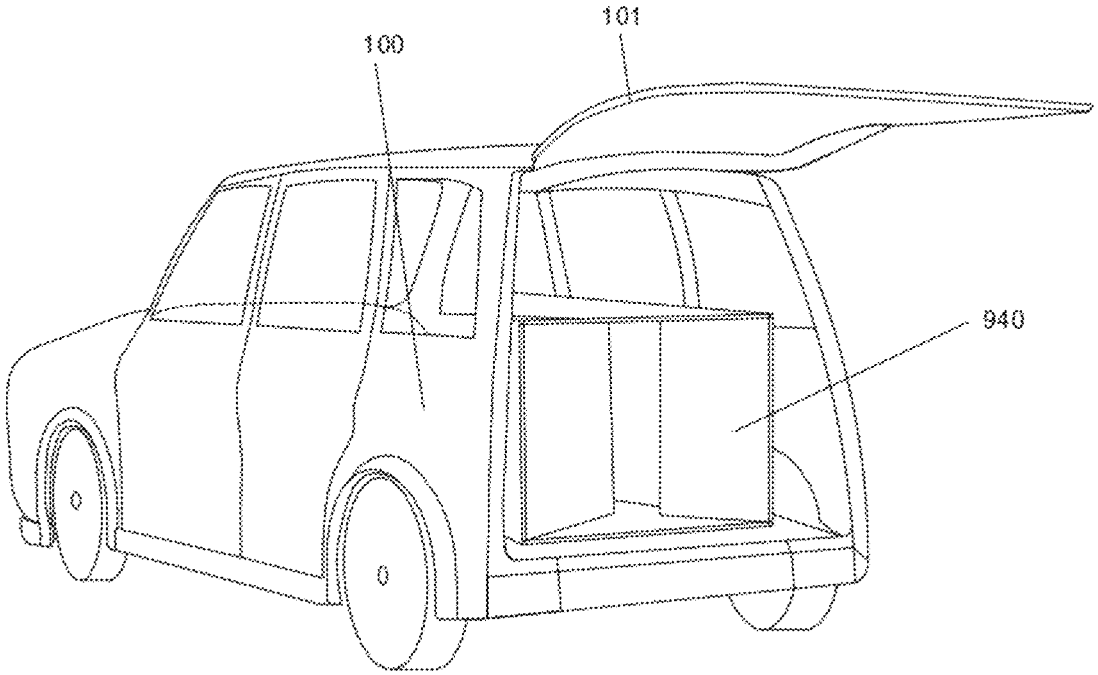
FIG. 26 is a schematic diagram of a rear side according to Embodiment 8 of the present disclosure (with a rear cover of a compartment opened)
Figure 27:
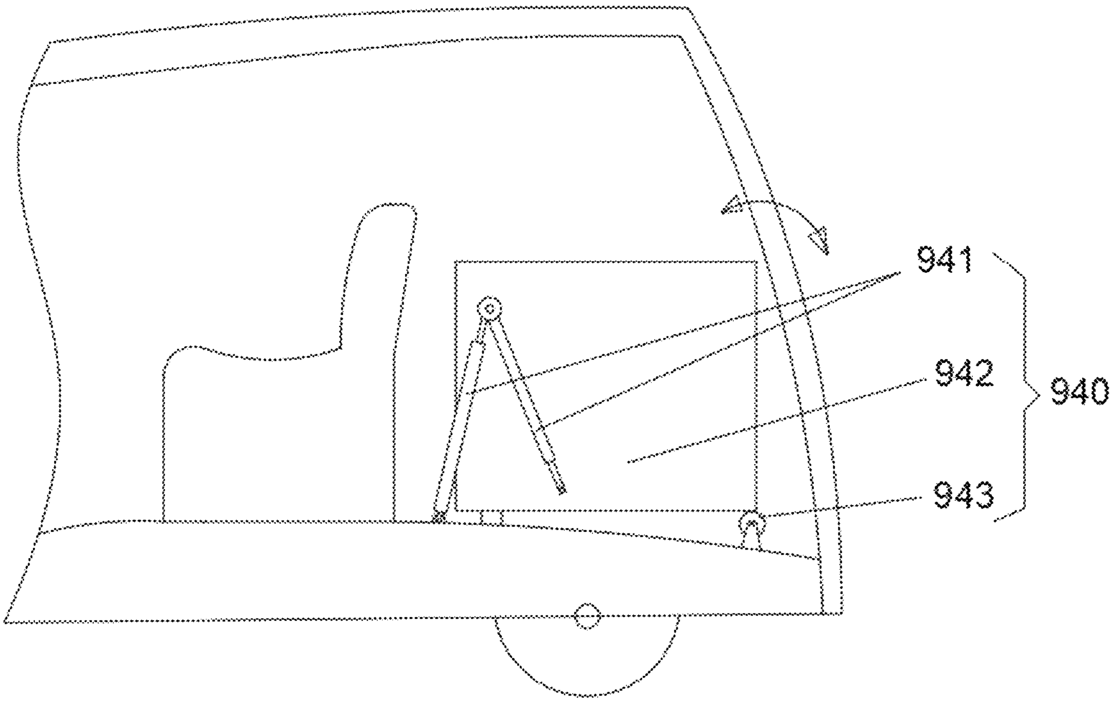
FIG. 27 is a side view according to Embodiment 8 of the present disclosure (in an accommodated state)
Figure 28:
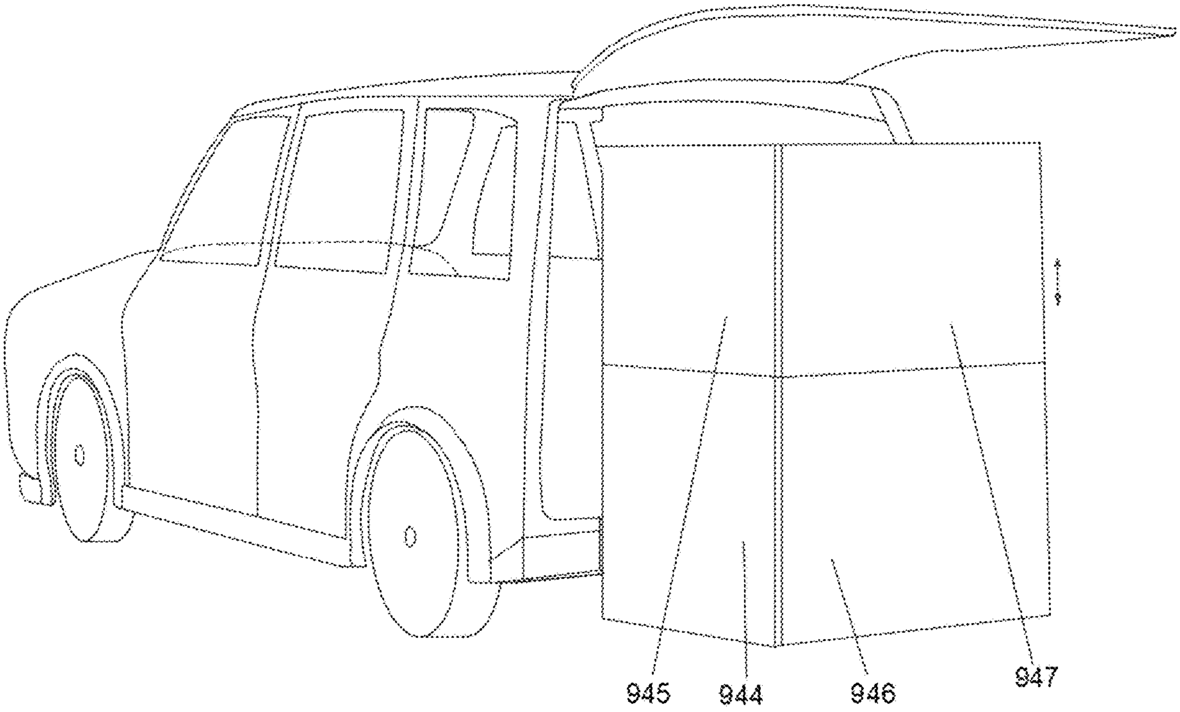
FIG. 28 schematically shows a completely unfolded state according to Embodiment 8 of the present disclosure.

In Embodiment 8, as shown in FIG. 26 to FIG. 28, the space extension assembly is designed as sliding-flipping assembly 940, including flipping drive assembly 941, flipping extension assembly 942, and support roller 943. One end of the flipping drive assembly 941 is connected to the left and right sides of the tail of the compartment of the automobile body 100, and the other end of the flipping drive assembly 941 is hinged on a sidewall of the flipping extension assembly 942. The support roller 943 is installed at the tail of the compartment of the automobile body 100 and is located below the flipping extension assembly 942.

When the rear cover 101 of the compartment is opened, the flipping drive assembly 941 is started, such that the flipping drive assembly 941 is unfolded and drives the flipping extension assembly 942 to slide backwards and flip to the vertical state. Folding plates on the flipping extension assembly 942 are sequentially unfolded to form a frame structure.

Specifically, the flipping drive assembly 941 adopts a plurality of hydraulic cylinders to form a linked mechanical arm. A movable end of the mechanical arm is always hinged on a bottom of the sidewall of the flipping extension assembly 942. An alarm length of the opened mechanical arm meets sliding-out and flipping operations of the flipping extension assembly 942, and a height and a width of the flipping extension assembly 942 match compartment space of the automobile body 100 to avoid an interference problem. In an accommodated state, the flipping extension assembly 942 is in a lying flat state and maintains a square frame structure. The bottom plate is folded inwards and attached to interiors of left and right side plates (the bottom plate faces the rear cover 101 of the compartment when being unfolded). The flipping extension assembly 942 includes second main side plate 944 and extended side plate 945 that are symmetrically arranged, as well as main back plate 946 and extended back plate 947 that are vertically connected to the side plate. The extended side plate 945 and the second main side plate 944 are stacked together through a pulling assembly or the flexible connector, and the extended back plate 947 and the main back plate 946 are stacked together through the pulling assembly or the flexible connector. When unfolded, the second main side plate 944, the extended side plate 945, the main back plate 946, and the extended back plate 947 are directly pushed upwards or flipped. When completely unfolded, the side plate, the back plate, and the bottom plate are mutually perpendicular to each other, forming a closed frame structure and expanding the interior space of the automobile.

When the flipping extension assembly 942 needs to be accommodated, the extended side plate 945 and the extended back plate 947 are firstly flipped or pushed inwards to achieve the stacked state. Then, the linked mechanical arm formed by the hydraulic cylinders begins to retract, driving the flipping extension assembly 942 in the stacked state to tilt and slide upwards. When the mechanical arm is fully reset, the flipping extension assembly 942 is driven to be in the initial lying flat state. Finally, the rear cover 101 of the compartment is covered, and original appearance of the automobile is restored.

In this embodiment, in addition to the main parts mentioned above, other locking and positioning parts are also provided to ensure stability of the sliding-flipping assembly 940 during traveling of the automobile.

Specifically, in all above embodiments, the flexible connector 908 is preferably selected as an articulated part. The flexible connector 908 is specifically made of an outdoor tent material, a waterproof material, a tape, or a zipper combination material, and preferably, is made of an outdoor tent material with a waterproof function. When two plates are connected, appropriate connecting clothes are specifically tailored to cover the two plates respectively. To ensure the connection strength, overlapping area can be increased. Two opposite faces of the two plates retain an appropriate flipping gap, which not only meets a fully closed state when the two plates are opened, but also ensures a folding margin when the two plates are closed.

In addition, the combined structure of the hinge structure and the single-sided flexible connector can also be used between two flipped or folded plates to ensure the connection strength and the sealing performance.

A specific sheet material of the space extension assembly may be aluminum-plastic sheet with a thickness of 2 mm to 3 mm, which is lightweight and strong, and better meets a use requirement.

It should be noted that relational terms herein such as "first" and "second" are merely used to distinguish one entity or operation from another entity or operation without necessarily requiring or implying any actual such relationship or order between such entities or operations. In addition, terms "include", "comprise", or their any other variations are intended to cover a non-exclusive inclusion, such that a process, a method, an article, or a device that includes a series of elements not only includes those elements, but also includes other elements that are not explicitly listed, or also includes inherent elements of the process, the method, the article, or the device.

The above embodiments are only intended to describe the preferred implementations of the present disclosure, but not to limit the scope of the present disclosure. Various alterations and improvements made by those of ordinary skill in the art to the technical solutions of the present disclosure without departing from the design spirit of the present disclosure shall fall within the protection scope of the appended claims of the present disclosure.

What is claimed is:

1. An automobile space extension mechanism, comprising a space extension assembly and an adapter assembly, wherein the space extension assembly is movably installed at a tail of a compartment of an automobile body through the adapter assembly; and in use, when a rear cover of the compartment is opened, the space extension assembly is unfolded backwards and downwards into a frame structure through pulling and flipping operations, and an opening side of the frame structure faces the compartment of the automobile body and is communicated to an interior space of the compartment;

wherein the space extension assembly is connected to left and right sides of the tail of the compartment of the automobile body in a sliding manner;

wherein the space extension assembly is connected to the left and right sides of the tail of the compartment of the automobile body through a slide rail connecting assembly or a guiding slide positioning plate;

wherein the slide rail connecting assembly comprises a side guiding slide groove and a side slide rail;

wherein the side slide rail is connected to the side guiding slide groove in the sliding manner, the side guiding slide groove is installed on the left and right sides of the tail of the compartment of the automobile body, and the side slide rail is connected to the space extension assembly;

wherein the guiding slide positioning plate is installed on the left and right sides of the tail of the compartment of the automobile body, and the space extension assembly is connected to a chute of the guiding slide positioning plate in the sliding manner;

wherein the space extension assembly comprises a side plate assembly, a back plate assembly, and a bottom plate that are connected together;

wherein the side plate assembly comprises a main side plate, an upper side plate, and a lower side plate, the upper side plate and the lower side plate are respectively telescopically connected to two ends of the main side plate, and the side slide rail of the slide rail connecting assembly is connected to an outer side face of the main side plate;

wherein the back plate assembly comprises an upper back plate, a main back plate, and a lower back plate that are arranged from top to bottom, the main back plate, the upper back plate, and the lower back plate are respectively connected in a flippable manner to outer side edges of the main side plate, the upper side plate, and the lower side plate; and wherein the bottom plate is connected to a bottom edge of the lower side plate.

2. The automobile space extension mechanism according to claim 1, wherein the bottom plate adopts a single-plate structure or a symmetrical double-plate structure; and when the single-plate structure is adopted, two ends of the bottom plate are connected to bottom edges of two lower side plates through screws; or when the double-plate structure is adopted, the bottom plate is connected in the flippable manner to the bottom edge of the lower side plate through a third rotary connector.

3. The automobile space extension mechanism according to claim 1, wherein the main back plate is hinged on the outer side edge of the main side plate through a second rotary connector, and both the upper back plate and the lower back plate are connected to the outer side edges of the upper side plate and the lower side plate through a first rotary connector; and the upper back plate and lower back plate are flipped and folded together with the upper side plate and the lower side plate, the main back plate is flipped and parallel to the main side plate, with a storage gap reserved in the middle, and a thickness of the storage gap matches a total thickness of the folded upper side plate, lower side plate, upper back plate, and lower back plate.

4. The automobile space extension mechanism according to claim 3, wherein inner side faces of upper and lower ends of the main side plate are provided with avoidance steps, and a depth of the avoidance step is greater than or equal to a total height of the upper side plate and the lower side plate; and a total height of the upper back plate and the lower back plate is less than or equal to a maximum total height of the upper side plate and the lower side plate.

5. An automobile space extension mechanism, comprising a space extension assembly and an adapter assembly, wherein the space extension assembly is movably installed at a tail of a compartment of an automobile body through the adapter assembly; and in use, when a rear cover of the compartment is opened, the space extension assembly is unfolded backwards and downwards into a frame structure through pulling and flipping operations, and an opening side of the frame structure faces the compartment of the automobile body and is communicated to an interior space of the compartment, wherein the space extension assembly is connected to a top of the tail of the compartment of the automobile body through a lifted guiding slide assembly, and the lifted guiding slide assembly comprises an upper guiding slide groove and an upper guiding slide plate that are connected together in the sliding manner, the upper guiding slide groove is installed on the top of the tail of the compartment of the automobile body, and the upper guiding slide plate is installed on the space extension assembly.

6. The automobile space extension mechanism according to claim 5, wherein during lifting, the space extension assembly is set as a lifted folding assembly, and the lifted folding assembly comprises an upper connecting plate, a folding side plate assembly, and a folding back plate assembly, a top surface of the upper connecting plate is connected to the upper guiding slide groove through the upper guiding slide plate in the sliding manner, two folding side plate assemblies are symmetrically arranged and connected to left and right side edges of the upper connecting plate, and the folding back plate assembly is connected in a flippable manner to the folding side plate assembly.

7. The automobile space extension mechanism according to claim 6, wherein the folding side plate assembly comprises an upper folding side plate, an intermediate folding side plate, and a lower folding side plate that are sequentially folded and connected together, one side edge of the upper folding side plate is connected to a side edge of the upper connecting plate, and edges connecting the upper folding side plate, the intermediate folding side plate, and the lower folding side plate are connected together through a 180° hinge structure or a flexible connector;

the folding back plate assembly comprises an upper folding back plate, an intermediate folding back plate, and a lower folding back plate, and the upper folding back plate, the intermediate folding back plate, and the lower folding back plate are respectively connected to outer side edges of the upper folding side plate, the intermediate folding side plate, and the lower folding side plate through a 90° hinge structure or the flexible connector; and the space extension assembly further comprises a bottom plate, wherein the bottom plate adopts a double-plate structure, and the bottom plate is connected in the flippable manner to a bottom edge of the lower folding side plate through the 90° hinge structure or the flexible connector.

8. An automobile space extension mechanism, comprising a space extension assembly and an adapter assembly, wherein the space extension assembly is movably installed at a tail of a compartment of an automobile body through the adapter assembly; and in use, when a rear cover of the compartment is opened, the space extension assembly is unfolded backwards and downwards into a frame structure through pulling and flipping operations, and an opening side of the frame structure faces the compartment of the automobile body and is communicated to an interior space of the compartment, wherein the space extension assembly is designed as an articulated flipping assembly, and the articulated flipping assembly is connected in a flippable manner to an adaptive positioning structure through a hinge; and the articulated flipping assembly comprises a flippable side plate assembly, a flippable back plate assembly, and a flippable bottom plate, the flippable side plate assembly comprises a main positioning plate and a lower flippable side plate, an inner side edge of the main positioning plate is hinged on the adaptive positioning structure, a side intermediate transition plate is hinged between the main positioning plate and the lower flippable side plate, and adjacent edges of the main positioning plate, the lower flippable side plate, and the side intermediate transition plate are connected together through a 90° articulation piece; and the flippable back plate assembly comprises a rear upper flippable plate and a rear lower flippable plate, the rear upper flippable plate is hinged on an outer vertical edge of the main positioning plate, and the rear lower flippable plate is hinged on an outer vertical edge of the lower flippable side plate; and a bottom edge of the rear upper flippable plate is hinged on a rear intermediate transition plate, and the flippable bottom plate is hinged on a bottom edge of the rear lower flippable plate.

9. The automobile space extension mechanism according to claim 8, wherein the adaptive positioning structure comprises a telescopic rod, a bottom of the telescopic rod is positioned and connected to a bottom of the compartment through a bottom connecting plate, and a positioning hole of the bottom connecting plate coincides with a positioning hole of a seat in an automobile;

a top of the telescopic rod is connected to a top positioning plate, and a top surface of the top positioning plate is connected to an adaptive member, the adaptive member is made of a flexible material; and an outer side of the telescopic rod is connected to an assembly positioning plate, the assembly positioning plate is provided with a plurality of positioning holes, and the inner side edge of the main positioning plate is hinged on the assembly positioning plate.

10. An automobile space extension mechanism, comprising a space extension assembly and an adapter assembly, wherein the space extension assembly is movably installed at a tail of a compartment of an automobile body through the adapter assembly; and in use, when a rear cover of the compartment is opened, the space extension assembly is unfolded backwards and downwards into a frame structure through pulling and flipping operations, and an opening side of the frame structure faces the compartment of the automobile body and is communicated to an interior space of the compartment, wherein the space extension assembly is designed as a roof folding extension assembly, and the roof folding extension assembly comprises an upper assembly and a lower assembly, the upper assembly comprises an upper side plate and an upper back plate that are hinged together, with a left side edge of the upper side plate hinged on the rear cover of the compartment; and the lower assembly comprises a lower side plate, a lower back plate, and a bottom plate, the lower side plate, the lower back plate, and the bottom plate are hinged together based on corresponding edges after the lower side plate, the lower back plate, and the bottom plate are flipped, and the lower side plate and the upper side plate are articulated or pulled together, and are in a stacked state when not unfolded and are of a frame structure when unfolded.

11. An automobile space extension mechanism, comprising a space extension assembly and an adapter assembly, wherein the space extension assembly is movably installed at a tail of a compartment of an automobile body through the adapter assembly; and in use, when a rear cover of the compartment is opened, the space extension assembly is unfolded backwards and downwards into a frame structure through pulling and flipping operations, and an opening side of the frame structure faces the compartment of the automobile body and is communicated to an interior space of the compartment, wherein the space extension assembly is designed as a roof Z-shaped folding assembly, and the roof Z-shaped folding assembly comprises an upper folding assembly, a lower folding assembly, and a straight-line-shaped bottom plate, the upper folding assembly comprises an upper side plate and an upper back plate that are hinged together, with a left side edge of the upper side plate hinged on the rear cover of the compartment; and the lower folding assembly comprises a lower side plate and a lower back plate that are hinged together, left and right edges of two symmetrical lower side plates are connected to the straight-line-shaped bottom plate, the two symmetrical lower side plates and the straight-line-shaped bottom plate are hinged together based on corresponding edges after the two symmetrical lower side plates and the straight-line-shaped bottom plate are flipped, edges that are of the lower side plate and the upper side plate and adjacent to each other are hinged together, and the lower side plate and the upper side plate are in a stacked state when not unfolded, are Z-shaped during unfolding, and are of a frame structure when completely unfolded.

12. An automobile space extension mechanism, comprising a space extension assembly and an adapter assembly, wherein the space extension assembly is movably installed at a tail of a compartment of an automobile body through the adapter assembly; and in use, when a rear cover of the compartment is opened, the space extension assembly is unfolded backwards and downwards into a frame structure through pulling and flipping operations, and an opening side of the frame structure faces the compartment of the automobile body and is communicated to an interior space of the compartment, wherein the space extension assembly is designed as a sliding-flipping assembly, comprising a flipping drive assembly, a flipping extension assembly, and a support roller, the flipping drive assembly comprises a first end connected to left and right sides of the tail of the compartment of the automobile body, and a second end hinged on a sidewall of the flipping extension assembly; and the support roller is installed at the tail of the compartment of the automobile body and located below the flipping extension assembly; and when the rear cover of the compartment is opened, the flipping drive assembly is started, wherein the flipping drive assembly is unfolded and drives the flipping extension assembly to slide backwards and flip to a vertical state; and folding plates on the flipping extension assembly are sequentially unfolded to form the frame structure.

* * * * *